(12) United States Patent
He et al.

(10) Patent No.: US 12,127,161 B2
(45) Date of Patent: Oct. 22, 2024

(54) METHOD AND APPARATUS FOR ASSIGNING AND UPDATING PAGING SUBGROUP

(71) Applicant: QUALCOMM Incorporated, San Diego, CA (US)

(72) Inventors: Linhai He, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/363,693

(22) Filed: Aug. 1, 2023

(65) Prior Publication Data

US 2024/0007997 A1    Jan. 4, 2024

Related U.S. Application Data

(62) Division of application No. 17/364,723, filed on Jun. 30, 2021.

(51) Int. Cl.
*H04W 68/00* (2009.01)
*H04W 76/27* (2018.01)
*H04W 76/30* (2018.01)

(52) U.S. Cl.
CPC ......... *H04W 68/005* (2013.01); *H04W 76/27* (2018.02); *H04W 76/30* (2018.02)

(58) Field of Classification Search
None
See application file for complete search history.

(56) References Cited

U.S. PATENT DOCUMENTS

| 2011/0051668 A1 | 3/2011 | Lee et al. |
| 2020/0245246 A1 | 7/2020 | Dhanda et al. |
| 2020/0275375 A1 | 8/2020 | Liu et al. |
| 2022/0046582 A1 | 2/2022 | Shrivastava et al. |

(Continued)

FOREIGN PATENT DOCUMENTS

WO    WO-2022205187 A1 * 10/2022

OTHER PUBLICATIONS

Mediatek, "Report of [AT114-e][025][ePowSav] Subgrouping Network Architecture", Doc Code, R2-2106666, dated May 2021 ( Year: 2021).*

(Continued)

*Primary Examiner* — Jamaal Henson
(74) *Attorney, Agent, or Firm* — Procopio, Cory, Hargreaves & Savitch LLP

(57) ABSTRACT

The method of wireless communication may include a UE, a base station, and a core network including an AMF. The UE may initiate an update of the paging subgroup ID assigned to the UE by transmitting paging assistance information to the AMF. The paging assistance information may include an expected paging probability of the UE. The base station may initiate an update of the paging subgroup ID assigned to the UE based on the change of RRC connection between the UE and the base station. The core network including the AMF may transmit an updated paging subgroup ID to the UE. The core network including the AMF may configure a set of candidate subgroups associated with the UE, and the base station may update the paging subgroup ID of the UE based on releasing the RRC connection to the RRC inactive state.

29 Claims, 16 Drawing Sheets

(56) References Cited

U.S. PATENT DOCUMENTS

| | | | |
|---|---|---|---|
| 2022/0124674 A1 | 4/2022 | Babaei | |
| 2022/0232514 A1* | 7/2022 | Tseng | H04W 60/00 |
| 2022/0279479 A1 | 9/2022 | Nader et al. | |
| 2022/0303071 A1 | 9/2022 | He et al. | |
| 2022/0312371 A1 | 9/2022 | Niu et al. | |
| 2022/0312499 A1 | 9/2022 | He et al. | |
| 2022/0369411 A1 | 11/2022 | Agiwal | |
| 2023/0007622 A1 | 1/2023 | He | |
| 2023/0015708 A1* | 1/2023 | Gurumoorthy | H04W 68/02 |
| 2023/0079204 A1* | 3/2023 | Nader | H04W 68/02 455/458 |
| 2023/0144750 A1 | 5/2023 | Agiwal et al. | |
| 2023/0379874 A1 | 11/2023 | He et al. | |

OTHER PUBLICATIONS

Intel Corporation: "Network Assigned Subgrouping", R2-2101301, 3GPP TSG RAN WG2 Meeting #113e, 3rd Generation Partnership Project (3GPP), Mobile Competence Centre, 650, Route Des Lucioles, F-06921, Sophia-Antipolis Cedex, France, vol. RAN WG2, No. E-Meeting, Jan. 25, 2021-Feb. 5, 2021, Jan. 15, 2021, XP051974247, 3 Pages, The whole document.

International Search Report and Written Opinion—PCT/US2022/032130—ISA/EPO—Sep. 28, 2022.

Mediatek Inc: "Report of [AT114-e][025][ePowSav] Subgrouping Network Architecture", 3GPP TSG-RAN WG2 Meeting #114 electronic, R2-2106666, 3rd Generation Partnership Project, Mobile Competence Centre, 650, Route Des Lucioles, F-06921 Sophia-Antipolis Cedex, France, vol. RAN WG2, No. Electronic, May 19, 2021-May 27, 2021, May 25, 2021, 22 Pages, XP052013867, paragraph [2.1(q1.I)]—paragraph 2.2 and 2.3.

QUALCOMM Inc: "Paging Subgroup Assignment", 3GPP TSG-RAN WG2 Meeting #114-e, R2-2104773, 3rd Generation Partnership Project (3GPP), Mobile Competence Centre, 650, Route Des Lucioles, F-06921 Sophia-Antipolis Cedex, France, vol. RAN WG2, No. Online, May 19, 2021-May 27, 2021, May 11, 2021, 3 Pages, XP052006535, The whole document.

* cited by examiner

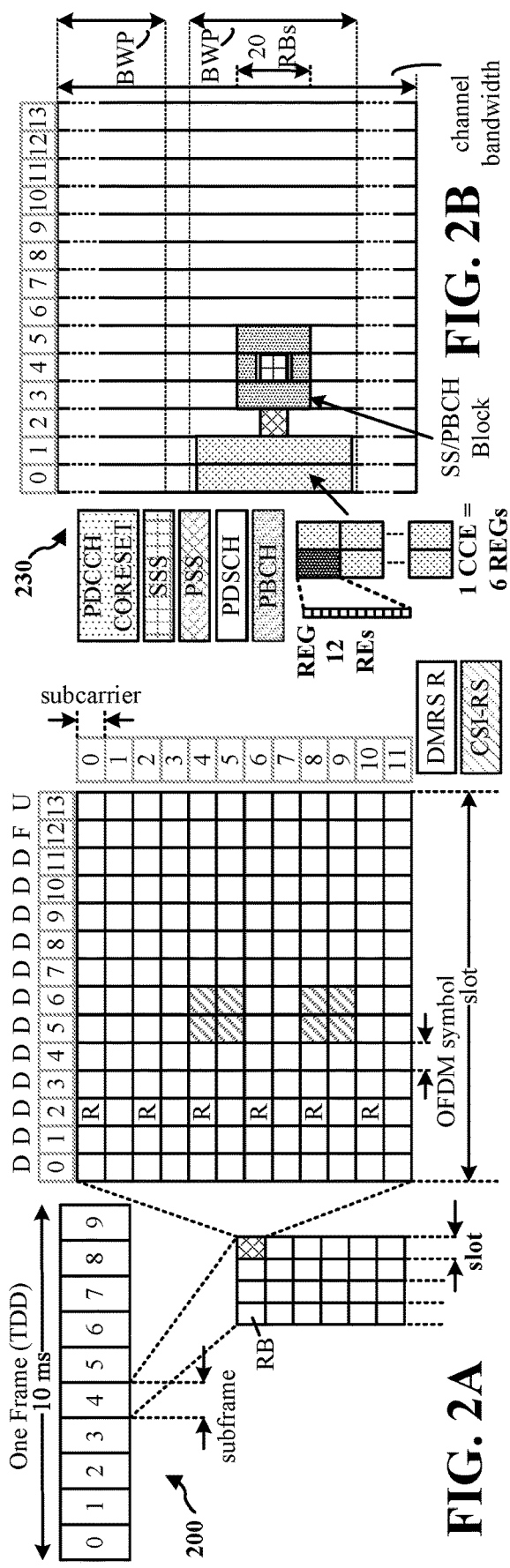
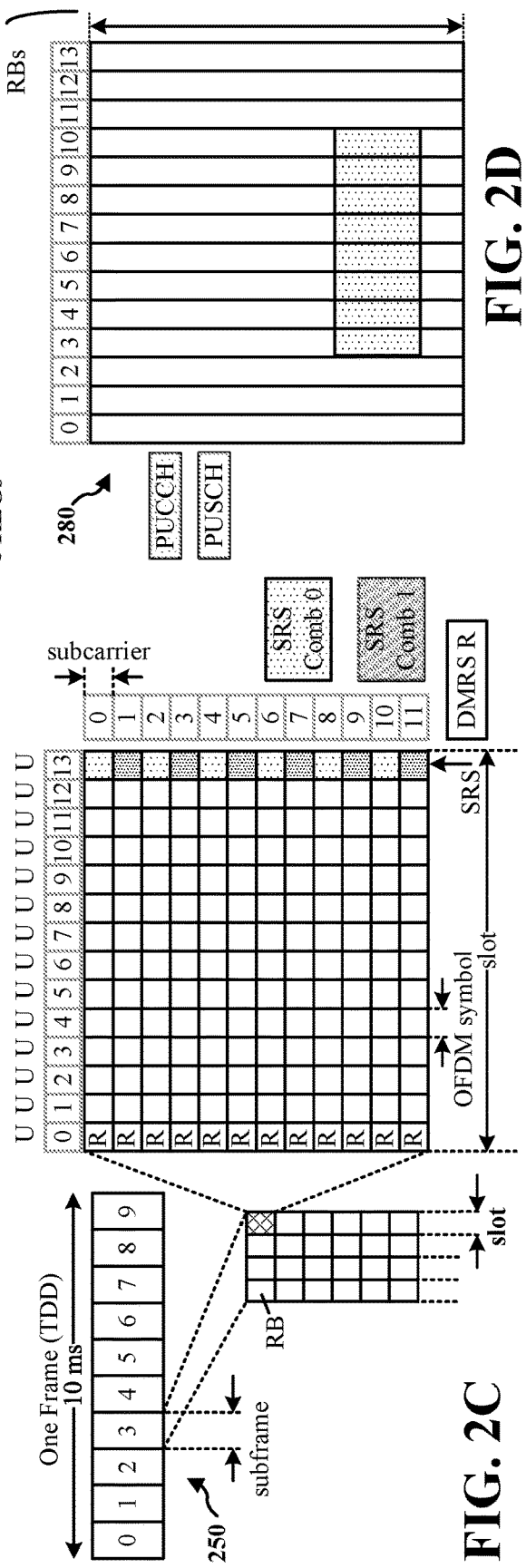
FIG. 2A
FIG. 2B
FIG. 2C
FIG. 2D

METHOD AND APPARATUS FOR ASSIGNING AND UPDATING PAGING SUBGROUP

CROSS REFERENCE TO RELATED APPLICATION(S)

This application is a Divisional of U.S. Non-provisional application Ser. No. 17/364,723, entitled "METHOD AND APPARATUS FOR ASSIGNING AND UPDATING PAGING SUBGROUP" and filed on Jun. 30, 2021, which is expressly incorporated by reference herein in its entirety.

TECHNICAL FIELD

The present disclosure relates generally to communication systems, and more particularly, to a method of wireless communication for assigning and updating a paging subgroup of a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may include a user equipment (UE), a base station, and a core network including an Access and Mobility Management Function (AMF). In some aspects, the UE may initiate an update of the paging subgroup identifier (ID) assigned to the UE by transmitting paging assistance information to the AMF. The paging assistance information may include at least one of a paging probability, a mobility profile, or a power profile of the UE. In one aspect, the paging assistance information may be transmitted in one or more of a registration request message or a registration update message, and the paging subgroup ID may be received in a registration acceptance message from the core network. In another aspect, the paging subgroup ID is received in a radio resource control (RRC) release message from the base station.

The base station may initiate an update of the paging subgroup ID assigned to the UE based on the change of RRC connection between the UE and the base station. The core network including the AMF may transmit an updated paging subgroup ID to the UE. In one aspect, the RRC state change includes a change of an RRC connection with the first UE to an RRC inactive state, and the base station may transmit paging assistance information to the network based on the RRC state change for the UE. The Core network including the AMF may configure an updated paging subgroup ID in response to the paging assistance information.

The core network including the AMF may configure a set of candidate subgroups associated with the UE, and the base station may update the paging subgroup ID of the UE based on releasing the RRC connection to the RRC inactive state. The core network may receive a UE capability indicating whether the UE supports subgrouping assigned by the network, and transmit the updated paging subgroup ID to the UE.

The core network including the AMF may receive, from a second UE, a second UE capability indicating that the second UE does not support subgrouping assigned by the network, and transmit, to the base station, a second paging notification including an indication that the second UE does not support subgrouping assigned by the network. The base station may transmit the second paging indication to the second UE in the second paging occasion with the subgroup ID based on the UE-ID of the second UE based on the second paging notification received from the network.

The UE may receive system information indicates a number of the UE subgroups assigned by at least one of the network or the base station, and monitor paging channel using the subgroup ID based on the UE receiving an assignment of the subgroup ID and the subgroup ID being less than the number of the subgroups indicated in the system information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
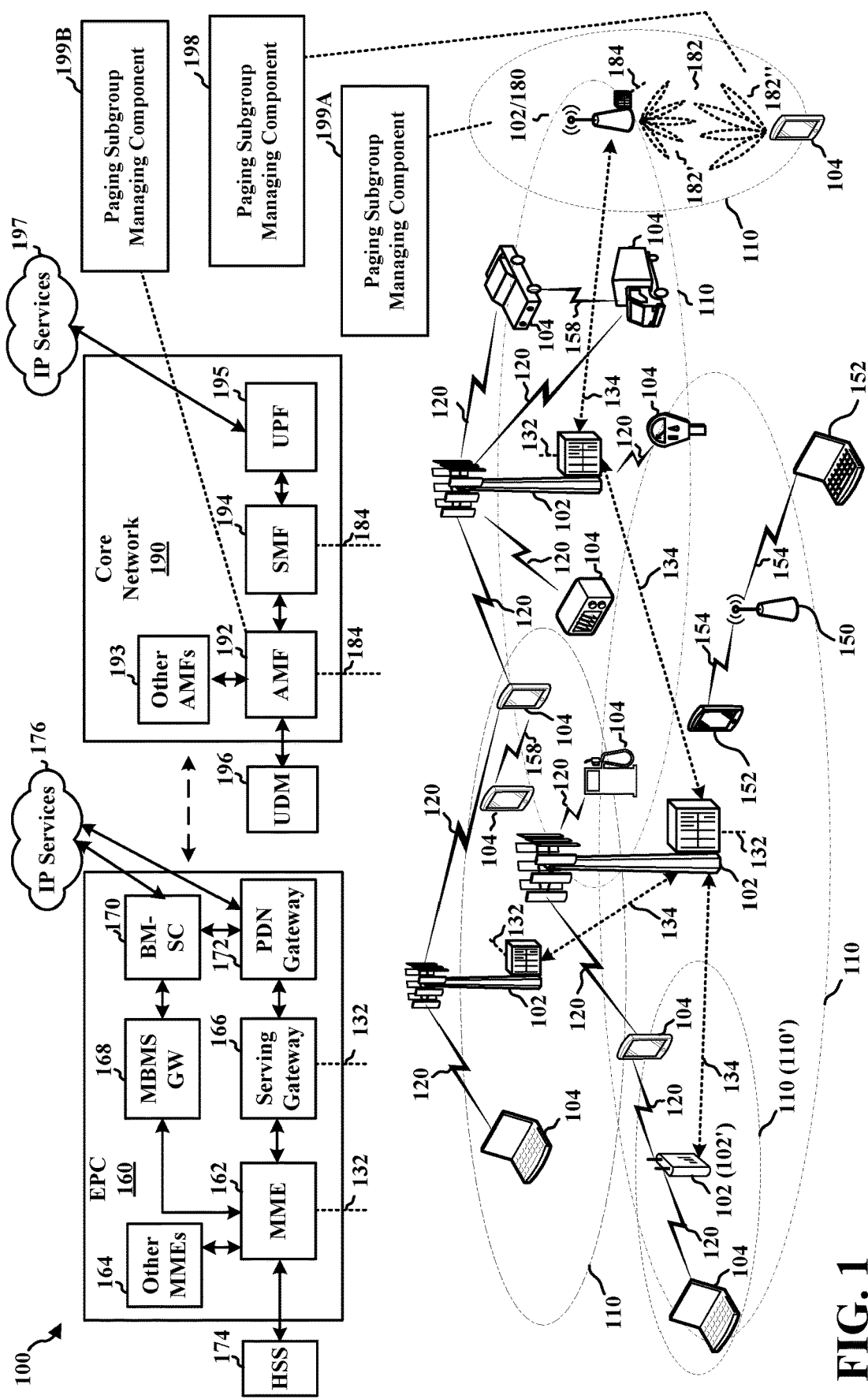
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a paging subgroup managing component 198 configured to transmit, to a network, a paging assistance information, and receive, from the network, a subgroup ID of the UE determined based on the paging assistance information. In certain aspects, the base station 180 may include a paging subgroup managing component 199A configured to receive, from a network, a message including an indication of at least one subgroup ID for a first UE based on an RRC state change for the first UE, receive, from the network, a first paging notification associated with the subgroup ID, and transmit, to the first UE, a first paging indication based on the first paging notification in a first paging occasion associated with the subgroup ID of the first UE. In certain aspects, the AMF of the core network 190 may include a paging subgroup managing component 199B configured to receive paging assistance information for a first UE, transmit a subgroup ID to the UE determined based on the paging assistance information, and transmit, to a base station, a message including a subgroup ID of the first UE. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
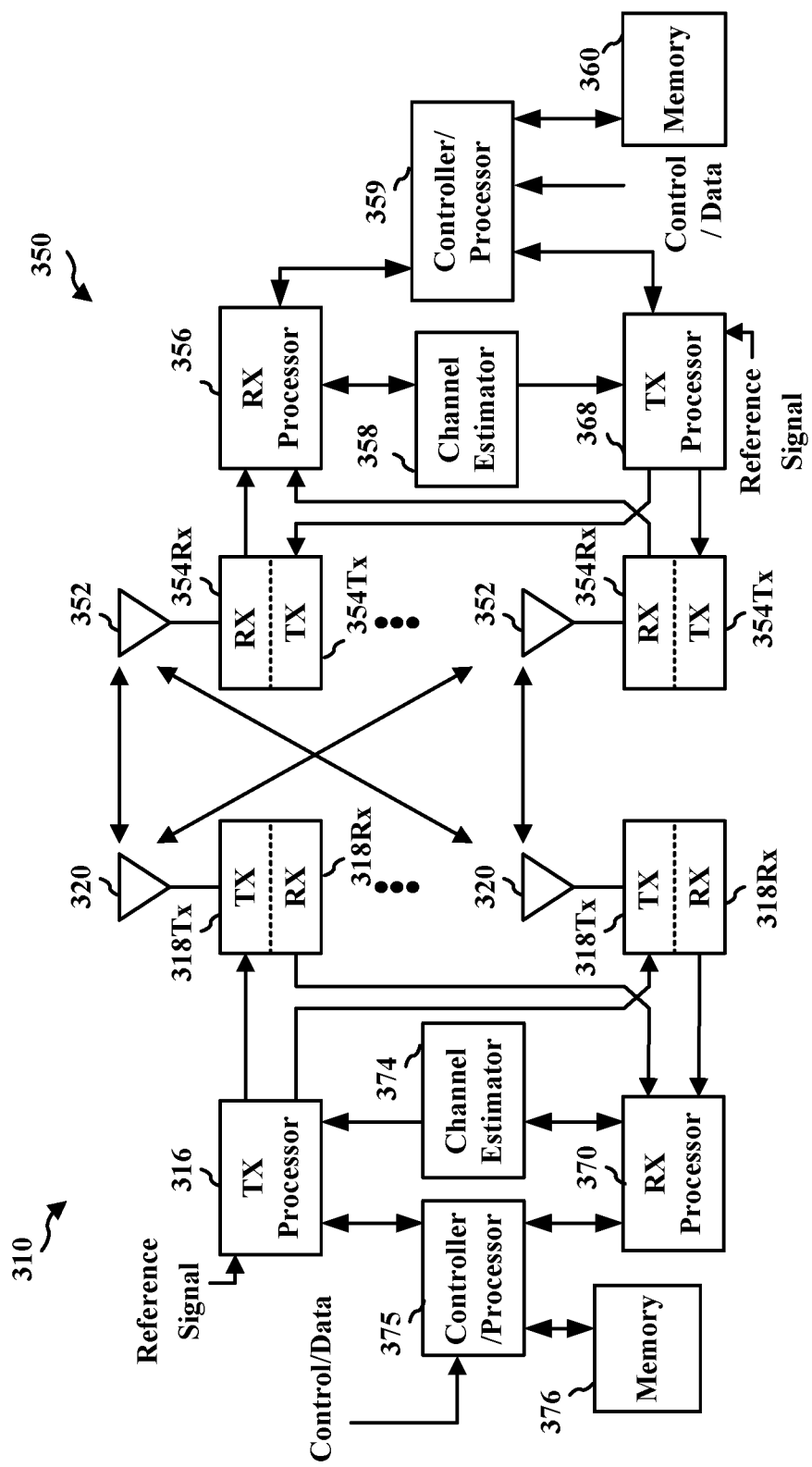
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199A of FIG. 1.

In some aspects, UEs in RRC idle/inactive mode may periodically (or aperiodically) wake up to receive paging messages from the base station, and the base station may transmit the paging messages to the UEs in the RRC idle/inactive mode. That is, the base station may transmit a paging indication, e.g., in a control channel such as a PDCCH, in a PO to indicate to the UE to monitor for a paging message. The UE may then monitor for the paging message from the base station in response to the associated paging indication received in the PO. The paging message may be transmitted in a data channel, e.g., PDSCH, in the same PO as the associated paging indication or in a different PO. The UE may monitor the PO for the paging indication and decode the paging message based on the received paging indication in the PO.

In some aspects, a plurality of UEs of a paging group may share the same PO, and the base station may transmit a paging message to the plurality of UEs of the paging group that share the same paging location. The plurality of UEs that share the same PO may be assigned to different paging subgroups. The network may indicate, in at least one of a paging early indication (PEI) or a paging DCI, the paging subgroup of the plurality of UEs that the paging message is intended for, and the UE may determine whether to monitor the PO to receive the paging message based on the paging subgroup indication received in at least one of the PEI or the paging DCI from the network.

A UE's paging subgroup may be assigned by the core network. The UE may be assigned with, and may use, the same paging subgroup for the RRC idle state and the RRC inactive state.

In one aspect, the UE may transmit a signal to the core network to enable an initial assignment of the paging subgroup and a UE initiated update of the paging subgroup of the UE. In another aspect, the core network may initiate an update of the paging subgroup of the UE. In another aspect, a plurality of UEs may be assigned with a mixture of first paging subgroups assigned by the core network and second paging subgroups derived based on the UE identifier (UE-ID).

Figure 4:
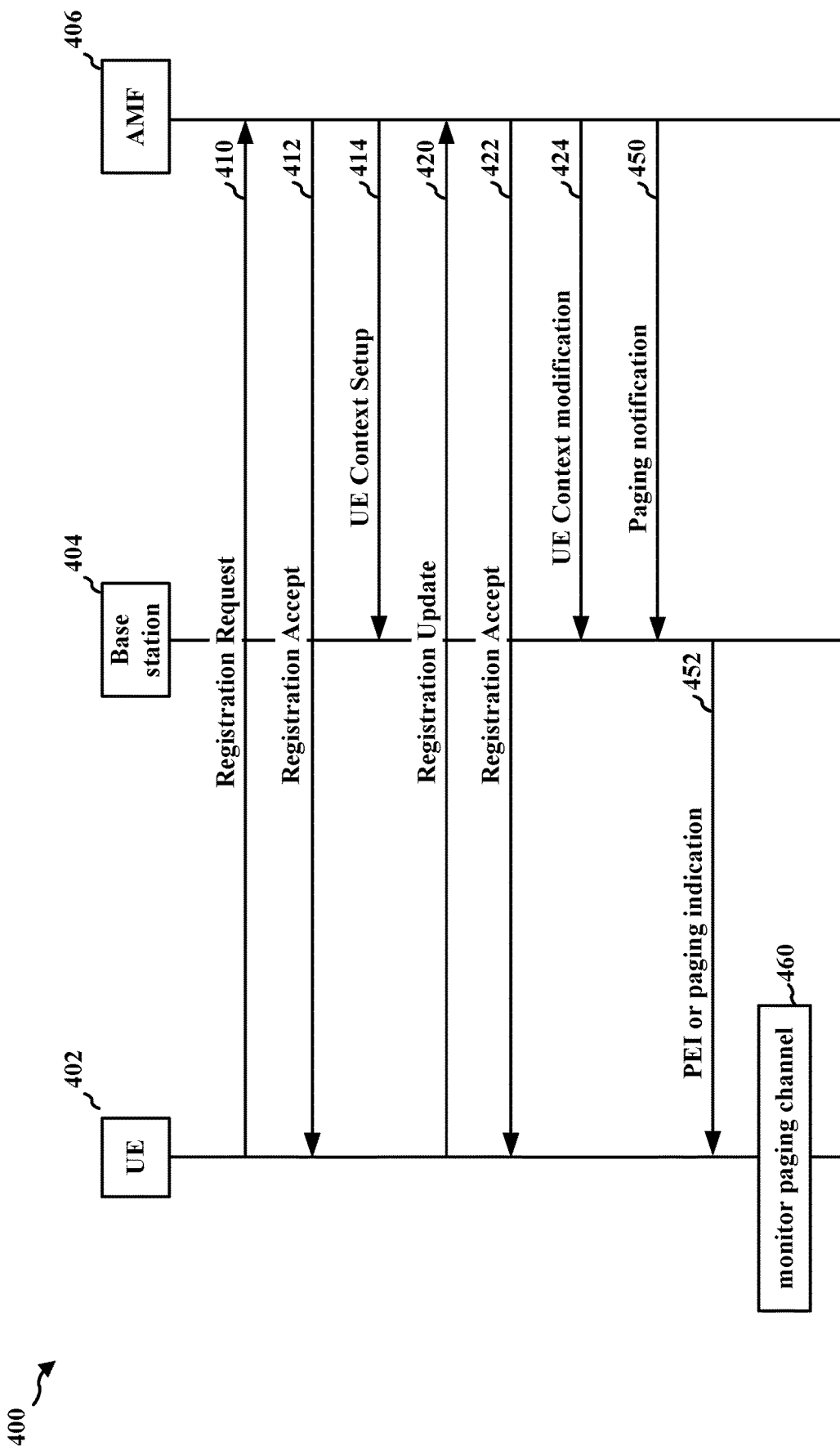
FIG. 4 is a communication diagram of a method of wireless communication.

FIG. 4 is a communication diagram 400 of a method of wireless communication. The communication diagram 400 may include a UE 402, a base station 404, and a core network including an AMF 406. In some aspects, the UE 402 may initiate assignment of the paging subgroup of the UE 402, and initiate an update of the paging subgroup assigned to the UE 402.

The UE 402 may initiate a registration process to request the core network including the AMF 406 of the paging subgroup of the UE 402, and the paging subgroup of the UE 402 may initially be assigned by the AMF 406 during registration procedure. That is, the UE 402 may transmit a registration request message to the AMF 406, and through the registration process, the AMF 406 may assign the paging subgroup of the UE 402. In one aspect, the paging subgroup may be determined based on the UE-ID.

In another aspect, the paging subgroup of the UE 402 may be determined based on UE 402 specific information. For example, the paging subgroup of the UE 402 may be determined based on UE Paging Assistance Information (UPAI). The UPAI of the UE 402 may include information relevant to the determination of the paging subgroup of the UE 402, such as expected paging probability, mobility status, power status, etc. That is, the UPAI may include attributes such as the paging probability of the UE 402 which may indicate the probability of the UE 402 receiving a paging message, the mobility status and/or profile of the UE 402 which may indicate whether the UE 402 is stationary or mobile, the power status and/or profile of the UE 402 which may indicate whether the UE 402 is power sensitive or insensitive.

The UE 402 may include UPAI in the registration request message transmitted to the AMF 406 of the core network including the AMF 406. The AMF 406 of the core network including the AMF 406 may assign a subgroup to UE 402 based on the provided UPAI. For example, the UE 402 may be included in a subgroup with other UEs that may share a similar expected paging probability, mobile status, or power status.

At 410, the UE 402 may transmit the registration request message to the AMF 406, and the AMF 406 may receive the registration request message from the UE 402. At 412, the AMF 406 may return the UE 402's subgroup ID in a registration accept message transmitted in response to the registration request message received at 410. The UE 402 may receive the subgroup ID of the UE 402 in the registration accept message received from the AMF 406 of the core network including the AMF 406. At 414, the AMF 406 may transmit, to the base station 404, a message including an indication of the paging subgroup ID of the UE 402, and the base station 404 may receive the message including the indication of the paging subgroup ID of the UE 402 from the AMF 406. For example, the message may be a UE context setup message including the paging subgroup ID of the UE 402. Here, we may refer to 410, 412, and 414 as the initial paging subgroup assignment of the UE 402.

In some aspects, the UE 402 may initiate the update of the assigned paging subgroup. The UE 402 may decide to request an updated paging subgroup based on new UPAI, and the UE 402 may perform a registration update procedure with the AMF 406 to submit the new UPAI.

At 420, the UE 402 may transmit, to the AMF 406, the registration update message including the new UPAI to request the updated paging subgroup, and the AMF 406 may receive, from the UE 402, the registration update message including the new UPAI and determine the updated paging subgroup for the UE 402. At 422, the AMF 406 may transmit, to the UE 402, the registration accept message including the updated paging subgroup, and the UE 402 may receive, from the AMF 406, the registration accept message including the updated paging subgroup. At 424, the AMF 406 may transmit, to the base station 404, a message including an indication of the updated paging subgroup ID of the UE 402, and the base station 404 may receive, from the AMF 406, the message including the updated paging subgroup of the UE 402. For example, the message may be a UE context modification message including the updated paging subgroup of the UE 402

The core network including the AMF 406 may determine to transmit a paging message to the UE 402 associated with the updated paging subgroup. At 450, the AMF 406 may transmit, to the base station 404, a paging notification including the paging subgroup ID of the UE 402 and the paging message directed to the UE 402 associated with the paging subgroup ID. The base station 404 may receive, from the AMF 406, the paging notification including the paging subgroup ID of the UE 402 and the paging message directed to the UE 402 associated with the paging subgroup ID. At 452, the base station 404 may transmit, to the UE 402, a paging indication (or a paging PDCCH) based on paging indication received from the AMF 406. The paging indication may include a PEI, and the paging indication may be transmitted in the paging occasion associated with the paging subgroup of the UE 402. At 460, the UE 402 may monitor the paging occasion associated with the paging subgroup of the UE 402 for the paging indication from the base station 404, and the UE 402 may use the paging indication to receive the paging message (or a paging PDSCH) from the base station 404.

Figure 5:
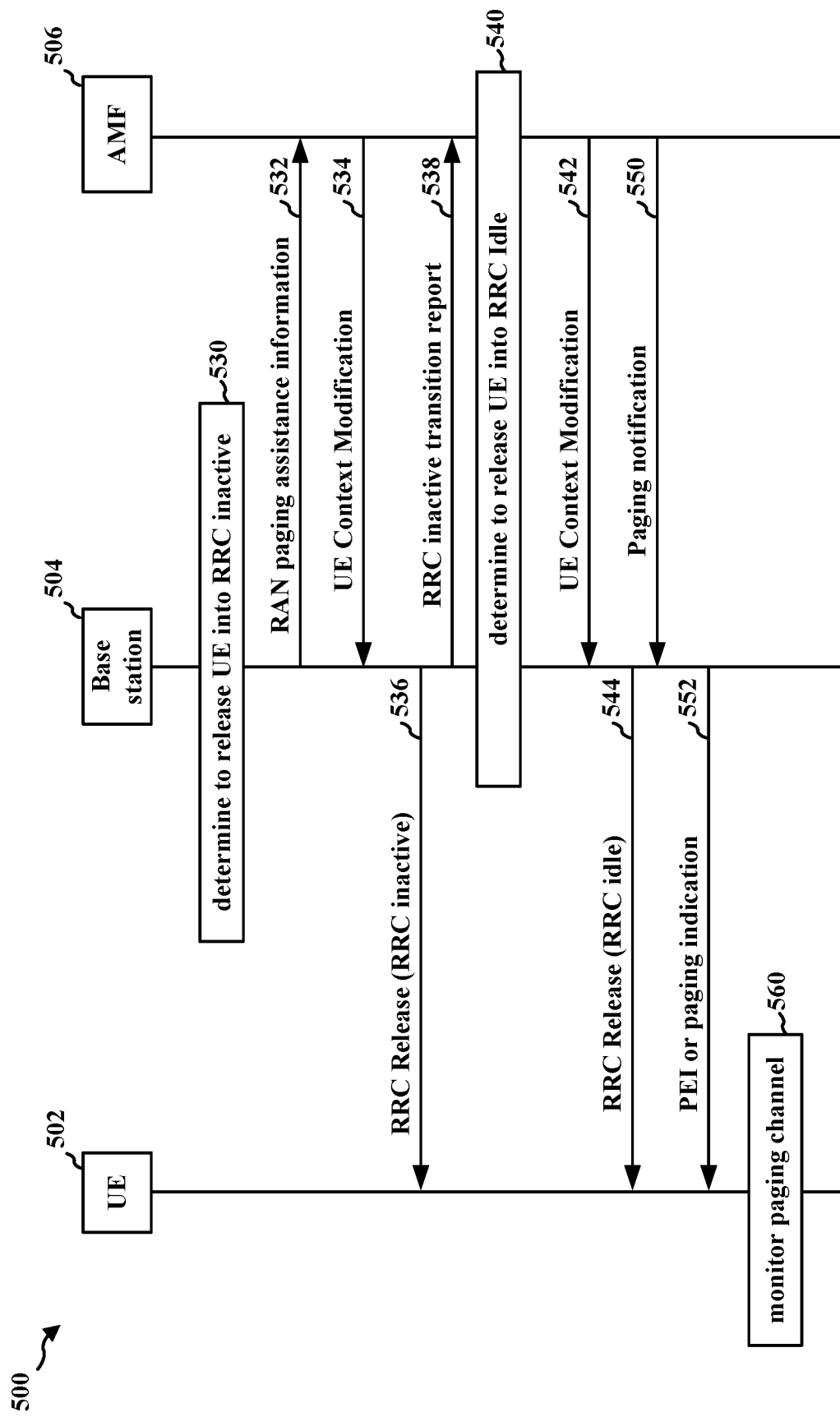
FIG. 5 is a communication diagram of a method of wireless communication.

FIG. 5 is a communication diagram 500 of a method of wireless communication. The communication diagram 500 may include a UE 502, a base station 504, and a core network including an AMF 506. In some aspects, the base station 504 may initiate an update of the paging subgroup assigned to the UE 502 based on the change of RRC connection between the UE 502 and the base station 504.

The core network or the base station 504 may determine to release the RRC connection with the UE 502, and after the base station 504 releases the RRC connection with the UE 502, the UE 502 in the RRC idle state or the RRC inactive state may be monitoring the paging occasions associated with the paging subgroup of the UE 502 to receive paging messages from the AMF 506 of the core network via the base station 504. The UE 502 may use the same paging subgroup for the RRC idle state and the RRC inactive state.

In some aspects, the UE 502 may have different paging probabilities in the RRC idle state and the RRC inactive state. For example, the core network or the base station 504 may release the UE 502 into the RRC inactive state rather based on the anticipation of new data to the UE 502 soon, and therefore, the UE 502 in the RRC inactive state may have relatively higher paging probability than the UE 502 in the RRC idle state. Accordingly, the core network or the base station 504 may assign different paging subgroups to the UE 502 or change paging subgroups of the UE 502 depending on the paging probability of the UE 502, when the core network or the base station 504 change the RRC state of the UE 502 and expect different paging probabilities for UE 502 in the RRC idle state and the RRC inactive state. The UE 502 initiated approach to update the paging subgroup in response to RRC state change may involve the UE switching to RRC Connected state again to perform this request.

When the base station 504 is about to release the UE 502 into the RRC inactive state and determine that the current paging subgroup of the UE 502 may no longer be optimal for the new RRC state. Here, the releasing of the RRC connection with the UE 502 to the RRC inactive state is not notified to the AMF 506 until receiving an RRC inactive transition report from the base station 504. Accordingly, the base station 504 may signal the AMF 506 to trigger an update of the paging subgroup of the UE 502 before releasing the RRC connection with the UE 502 to the RRC inactive state. This signal may include RAN paging assistance information including UE 502's expected paging probability. That is, the RAN paging assistance information may include the probability of the UE 502 receiving a paging message expected from the base station 504.

At 530, the base station 504 may determine to release the UE 502 into RRC inactive state. At 532, the base station 504 may transmit the RAN paging assistance information to the AMF 506 including UE 502's expected paging probability. The AMF 506 may receive the RAN paging assistance information from the base station 504 and determine an updated paging subgroup of the UE 502 based on the RAN paging assistance information received from the base station 504. At 534, the AMF 506 may transmit, to the base station 504, a message including an indication of the updated paging subgroup ID of the UE 502, and the base station 504 may receive the message including the updated paging subgroup of the UE 502. For example, the message may be the UE context modification message including the updated paging subgroup of the UE 502. At 536, the base station 504 may transmit, to the UE 502, the RRC release message instructing the UE 502 to enter the RRC inactive state, and the RRC release message may include the updated paging subgroup of the UE 502. At 538, the base station 504 may transmit, to the AMF 506, the RRC inactive transition report indicating that the base station 504 released the RRC connection with the UE 502 to the RRC inactive state.

When the base station 504 is about to release the UE 502 into the RRC idle state, the AMF 506 may determine to update the paging subgroup of the UE if the AMF 506 may anticipate a change in the paging probability in the UE 502 in the RRC idle state. As the AMF 506 is involved in the procedure of releasing the RRC connection to the RRC idle state, the AMF 506 may determine to update the paging subgroup of the UE 502. The AMF 506 may send the updated paging subgroup ID to base station 504 using the UE Context Modification message transmitted to base station 504, and the base station 504 may provide the updated paging subgroup ID to UE 502 in the RRC release message.

At 540, the base station 504 and the AMF 506 may determine to release the UE 502 into the RRC idle state. At 542, the AMF 506 may transmit, to the base station 504, a message including an indication of the updated paging subgroup ID of the UE 502, and the base station 504 may receive, from the AMF 506, the message including the updated paging subgroup ID of the UE 502. For example, the message may be the UE context modification message including the updated paging subgroup of the UE 502. At 544, the base station 504 may transmit, to the UE 502, the RRC release message instructing the UE 502 to enter the RRC idle state, and the RRC release message may include the updated paging subgroup of the UE 502.

The core network including the AMF 506 may determine to transmit a paging message to the UE 502 associated with the updated paging subgroup. At 550, the AMF 506 may transmit, to the base station 504, a paging notification including the paging subgroup ID of the UE 502 and the paging message directed to the UE 502 associated with the paging subgroup ID. The base station 504 may receive, from the AMF 506, the paging notification including the paging subgroup ID of the UE 502 and the paging message directed to the UE 502 associated with the paging subgroup ID. At 552, the base station 504 may transmit, to the UE 502, a paging indication (or a paging PDCCH) based on paging indication received from the AMF 506. The paging indication may include a PEI, and the paging indication may be transmitted in the paging occasion associated with the paging subgroup of the UE 502. At 560, the UE 502 may monitor the paging occasion associated with the paging subgroup of the UE 502 for the paging indication from the base station 504, and the UE 502 may use the paging indication to receive the paging message (or a paging PDSCH) from the base station 504.

Figure 6:
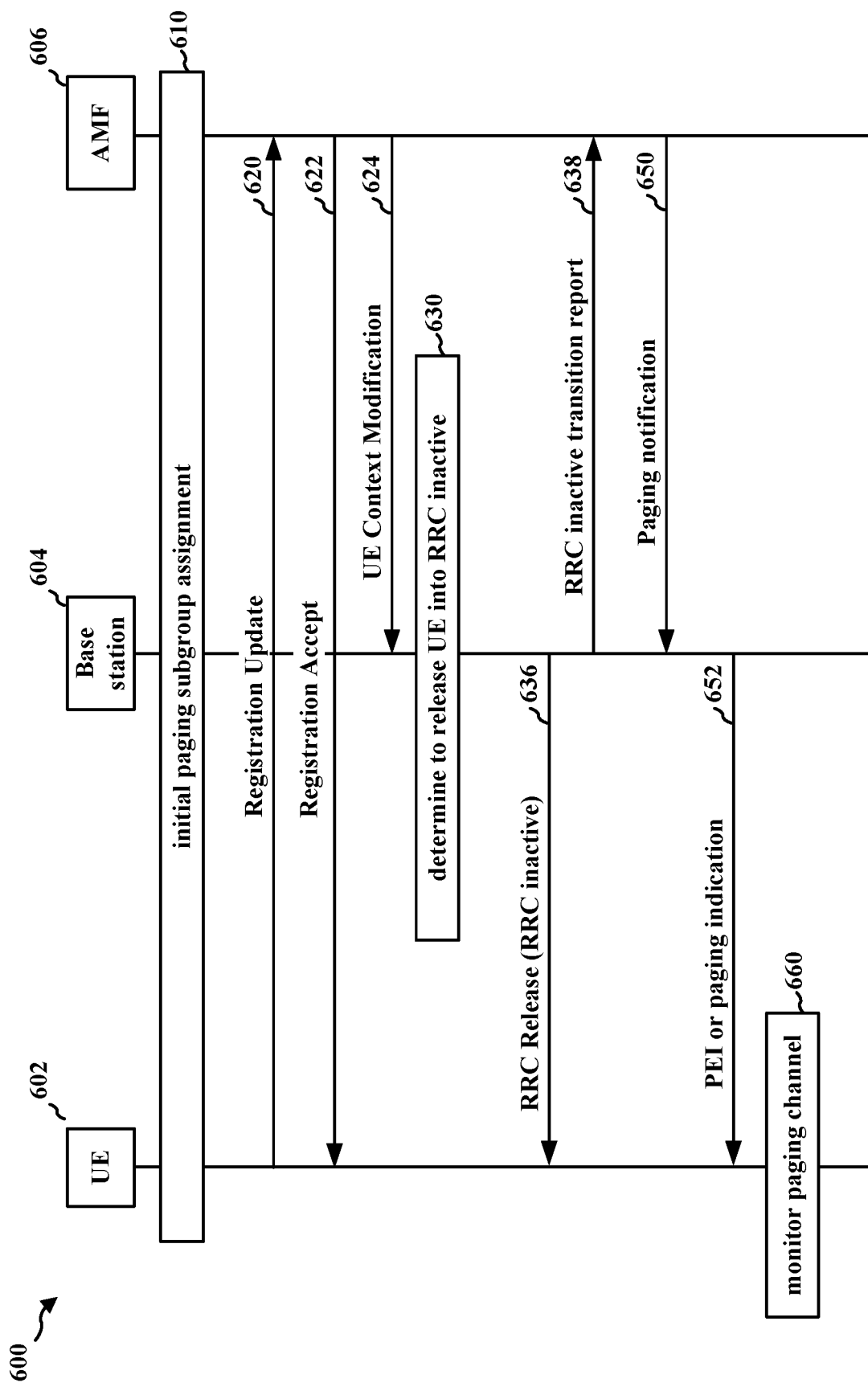
FIG. 6 is a communication diagram of a method of wireless communication.

FIG. 6 is a communication diagram 600 of a method of wireless communication. The communication diagram 600 may include a UE 602, a base station 604, and a core network including an AMF 606. In some aspects, the core network may configure a set of candidate subgroups associated with the UE 602, and the base station 604 may update the paging subgroup of the UE 602 based on releasing the RRC connection between the UE 602 and the base station 604 to the RRC inactive state.

During the initial paging subgroup assignment or the update of the paging subgroup of the UE 602, the AMF 606 may configure a set of candidate subgroups for the UE 602 in the RRC inactive state. That is, when the AMF 606 assigns or updates a paging subgroup of the UE 602, the AMF 606 may also determine a set of candidate subgroups for the UE 602 in the RRC inactive state. After the AMF 606 configures a subgroup for UE 602, the AMF 606 may provide the information to base station 604. The AMF 606 may also choose to provide, to base station 604, the set of candidate subgroups for UE 602 in the RRC inactive state, for use in RRC inactive state. The base station 604 may receive the set of candidate subgroups from the AMF 606, and the before the base station 604 releases the RRC connection of the UE 602 to RRC inactive state, base station 604 has the option of assigning the UE 602 with a different subgroup selected from the set of candidate subgroup provided by the AMF 606. Accordingly, the base station 604 may have more control in which paging subgroup to use for the UE 602 in the RRC inactive state, based on its prediction on UE 602's paging characteristics, e.g., UPAI. The base station 604 may provide the new subgroup ID to the UE 602 in the RRC release message, and the base station 604 may notify the AMF 606 of the UE 602's updated paging subgroup. For example, the base station 604 may transmit, to the AMF 606, the RRC inactive transition report including the updated paging subgroup of the UE 602.

At 610, the UE 602, the base station 604, and the AMF 606 may perform an initial paging subgroup assignment of the UE 602. Referring to 410, 412, and 414 of FIG. 4, at 610, the UE 602 may transmit the registration request message to the AMF 606, and the AMF 606 may receive the registration request message from the UE 602. The AMF 606 may return, to the base station 604, the UE 602's subgroup ID in a registration accept message transmitted in response to the registration request message received at 610. Furthermore, the UE context setup message transmitted to the base station 604 may include a set of candidate subgroups associated with the UE 602. The UE 602 may receive the subgroup ID of the UE 602 in the registration accept message received from the AMF 606 of the core network including the AMF 606. The AMF 606 may transmit, to the base station 604, a UE context setup message including the paging subgroup ID of the UE 602, and the base station 604 may receive the UE context setup message from the AMF 606.

At 620, the UE 602 may transmit, to the AMF 606, the registration update message including the new UPAI to request the updated paging subgroup, and the AMF 606 may receive, from the UE 602, the registration update message including the new UPAI and determine the updated paging subgroup for the UE 602. At 622, the AMF 606 may transmit, to the UE 602, the registration accept message including the updated paging subgroup, and the UE 602 may receive, from the AMF 606, the registration accept message including the updated paging subgroup. At 624, the AMF 606 may transmit, to the base station 604, a message including an indication of the paging subgroup ID of the UE 602, and the base station 604 may receive, from the AMF 606, the message including the updated paging subgroup of the UE 602. For example, the message may be a UE context modification message including the paging subgroup ID of the UE 602. Furthermore, the UE context modification message transmitted to the base station 604 may include the set of candidate subgroups associated with the UE 602.

At 630, the base station 604 may determine to release the UE 602 into RRC inactive state. Based on the candidate subgroups associated with the UE 602 received from the AMF 606 in UE context setup message at 610 or the UE context modification message at 624, the base station may select one paging subgroup from the set of candidate subgroups for the UE 602 entering the RRC inactive state. At 636, the base station 604 may transmit, to the UE 602, the RRC release message instructing the UE 602 to enter the RRC inactive state, and the RRC release message may include the updated paging subgroup of the UE 602. At 638, the base station 604 may transmit, to the AMF 606, the RRC inactive transition report indicating that the base station 604 released the RRC connection with the UE 602 to the RRC inactive state, and the RRC inactive transition report may further include the updated paging subgroup of the UE 602.

The core network including the AMF 606 may determine to transmit a paging message to the UE 602 associated with the updated paging subgroup. At 650, the AMF 606 may transmit, to the base station 604, a paging notification including the paging subgroup ID of the UE 602 and the paging message directed to the UE 602 associated with the paging subgroup ID. The base station 604 may receive, from the AMF 606, the paging notification including the paging subgroup ID of the UE 602 and the paging message directed to the UE 602 associated with the paging subgroup ID. At 652, the base station 604 may transmit, to the UE 602, a paging indication (or a paging PDCCH) based on paging indication received from the AMF 606. The paging indication may include a PEI, and the paging indication may be transmitted in the paging occasion associated with the paging subgroup of the UE 602. At 660, the UE 602 may monitor the paging occasion associated with the paging subgroup of the UE 602 for the paging indication from the base station 604, and the UE 602 may use the paging indication to receive the paging message (or a paging PDSCH) from the base station 604.

In some aspects, a plurality of UEs may include a first set of UEs with the paging subgroups assigned by the core network and a second set of UEs with the paging subgroups configured by the base station. In one aspect, the core network including AMF may assign, for the first set of UEs, the paging subgroups based on the UE characteristics (e.g.

paging probability). Generally, a relatively small number of subgroups may be assigned by the core network.

In another aspect, the RAN including the base station may assign, for the second set of UEs, the paging subgroups based on the corresponding UE-IDs. For example, the second set of UEs may include UEs that are insensitive to attributes used by core network to assign subgroups, and the UEs that are connected to base stations that do not support the core network based paging subgroup assignment.

The base station may advertise its system information to the plurality of UEs, and the system information may include the number of UE paging subgroups. In one aspect, the number of the UE paging subgroups may include at least one of a total number of UE subgroups ($N_{total}$) or a number of UE subgroups assigned by the core network ($N_{CN}$). Here, $N_{RAN}=N_{total}-N_{CN}$ may represent the number of paging subgroups that do not support or are not assigned by the core network.

The UE may monitor paging channel using the paging subgroup ID based on determining that the received assignment of the paging subgroup ID is properly supported by the number of the paging subgroups assigned by the core network. In one aspect, the base station may broadcast $N_{CN}$, and the UE may determine that the paging subgroup is properly supported, or properly assigned, based on the paging subgroup ID being smaller than or equal to the $N_{CN}$ (paging subgroup ID≤$N_{CN}$). In another aspect, the base station may broadcast $N_{RAN}$, and the UE may determine that the paging subgroup is properly supported based on the paging subgroup ID being greater than the $N_{RAN}$ (paging subgroup ID>$N_{RAN}$). The UE may use the paging subgroup ID to receive the paging messages by monitoring the paging occasions associated with the paging subgroup ID.

If the UE determines that the received assignment of the paging subgroup ID is not properly supported by the number of the paging subgroups assigned by the core network, the UE may monitor one or more paging occasions associated with paging subgroup ID derived based on the UE-ID. In one aspect, the base station may broadcast $N_{CN}$, and the UE may determine that the paging subgroup is not properly supported based on the paging subgroup ID being greater than the $N_{CN}$ (paging subgroup ID>$N_{CN}$). Accordingly, the UE may derive the paging subgroup ID based on its UE-ID according to the following formula: UE-ID mod ($N_{RAN}+N_{CN}+1$). In another aspect, the base station may broadcast $N_{RAN}$, and the UE may determine that the paging subgroup is not properly supported based on the paging subgroup ID being smaller than or equal to the $N_{RAN}$ (paging subgroup ID≤$N_{RAN}$). Accordingly, the UE may derive the paging subgroup ID based on its UE-ID according to the following formula: UE-ID mod $N_{RAN}$. The UE may monitor the paging occasions associated with the paging subgroup ID derived based on its UE-ID.

The UEs may not support network assigned paging subgrouping. The UE that does not support the network assigned paging subgrouping may indicate the capability of the UE to the core network, i.e., indication that the UE does not supporting NW assigned subgrouping. For example, the UE may use a Non-Access-Stratum (NAS) signaling to indicate the UE capability to the AMF. The indication may be provided during the attach procedure or the registration request/update procedures or messages.

In response, the AMF may indicate that the UE does not support the network assigned paging subgrouping in the paging notification message to the RAN including the base station. In one aspect, the AMF may explicitly indicate that the UE does not support the network assigned paging subgrouping. In another aspect, the AMF may implicitly indicate that the UE does not support the network assigned paging subgrouping. For example, the AMF may implicitly indicate that the UE does not support the network assigned paging subgrouping by the absence of a paging subgroup ID in the paging notification message.

Figure 7:
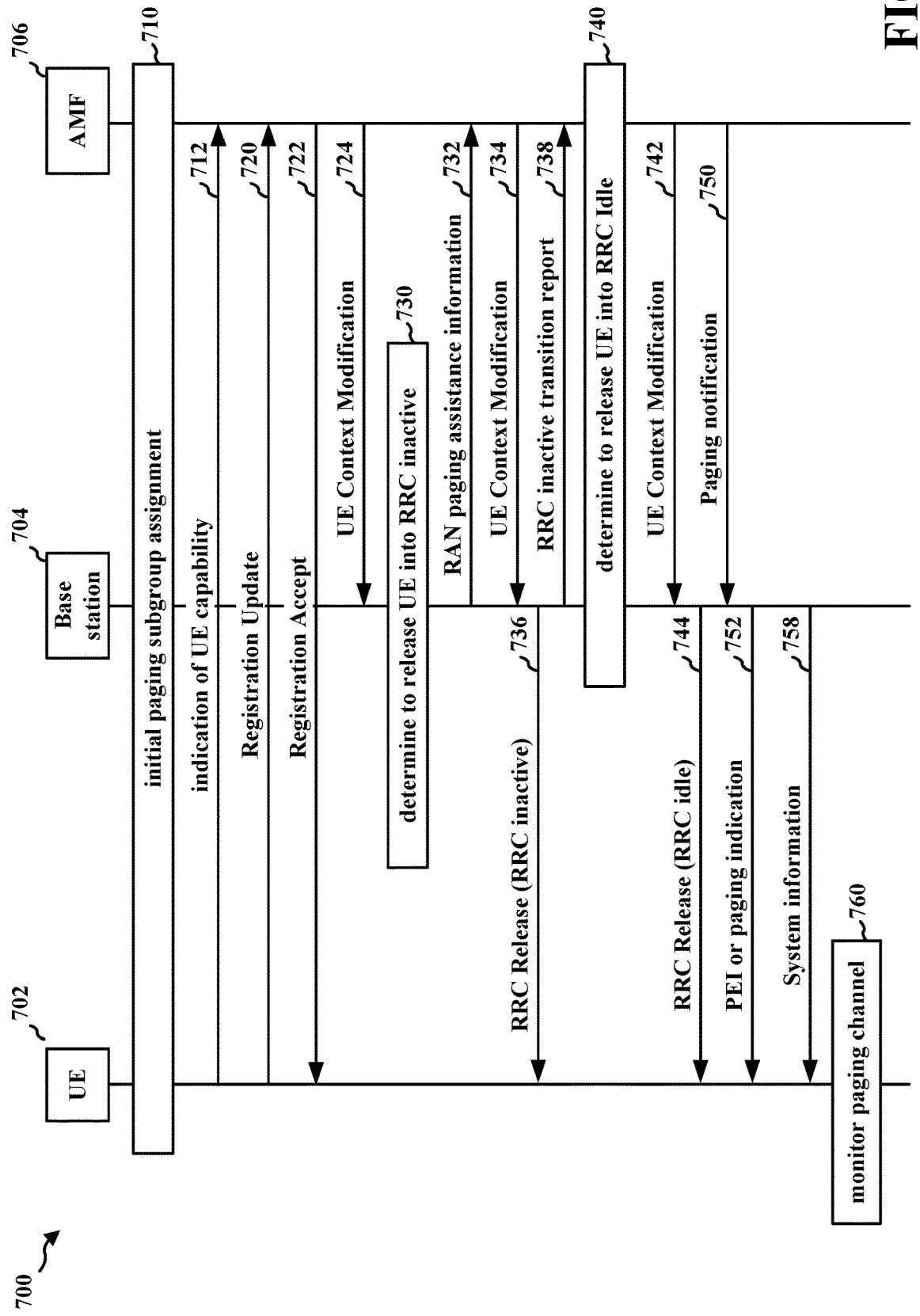
FIG. 7 is a communication diagram of a method of wireless communication.

FIG. 7 is a communication diagram 700 of a method of wireless communication. The communication diagram 700 may include a UE 702, a base station 704, and a core network including a AMF 706. In some aspects, the UE 702 may initiate assignment of the paging subgroup of the UE 702, and initiate an update of the paging subgroup assigned to the UE 702. The base station 704 may initiate an update of the paging subgroup assigned to the UE 702 based on the change of RRC connection between the UE 702 and the base station 704. The core network including the AMF 706 may configure a set of candidate subgroups associated with the UE 702, and the base station 704 may update the paging subgroup of the UE 702 based on releasing the RRC connection between the UE 702 and the base station 704 to the RRC inactive state.

At 710, the UE 702, the base station 704, and the AMF 706 may perform an initial paging subgroup assignment of the UE 702. The UE 702 may transmit the registration request message to the AMF 706, and the AMF 706 may receive the registration request message from the UE 702. The AMF 706 may return, to the base station 704, the Paging subgroup ID of the UE 702 in a registration accept message transmitted in response to the registration request message received at 710. Furthermore, a UE context setup message transmitted to the base station 704 may include a set of candidate subgroups associated with the UE 702. The UE 702 may receive the paging subgroup ID of the UE 702 in the registration accept message received from the AMF 706 of the core network including the AMF 706. The AMF 706 may transmit, to the base station 704, the UE context setup message including the paging subgroup ID of the UE 702, and the base station 704 may receive the UE context setup message from the AMF 706.

At 712, the UE 702 may transmit, to the network, an indication of UE 702 capability indicating whether the UE 702 supports the subgrouping assignment by the network. The AMF 706 may receive, from the UE 702, the indication of the UE 702 capability indicating whether the UE 702 supports the subgrouping assignment by the network. The AMF 706 may determine the paging subgroup of the UE 702 based on the indication of the UE 702 capability. For example, the UE 702 may use an NAS signaling to indicate the UE 702 capability to the AMF 706. The indication may be provided during the attach procedure or the registration request/update procedures or messages.

At 720, the UE 702 may transmit, to the AMF 706, a paging assistance information, and the AMF 706 may receive the UPAI for the UE 702. That is, the UE 702 may transmit, to the AMF 706, the registration update message including the new UPAI to request the updated paging subgroup, and the AMF 706 may receive, from the UE 702, the registration update message including the new UPAI and determine the updated paging subgroup for the UE 702. The UPAI may include at least one of a paging probability, a mobility profile, or a power profile. The paging assistance information may be transmitted in one or more of a registration request message at 710 or the registration update message at 720.

At 722, the AMF 706 may transmit an updated paging subgroup ID of the UE 702 determined based on the paging assistance information, and the UE 702 may receive, from the core network including the AMF 706, the updated paging subgroup ID of the UE 702 determined based on the paging assistance information. The updated paging subgroup ID may be received in the registration acceptance message from the core network including AMF 706.

At 724, the AMF 706 may transmit, to a base station 704, a message including an indication of the paging subgroup ID of the UE 702, based on the RRC state change for the UE 702, and the base station 704 may receive, from the core network including AMF 706, the message including the indication of at least one updated paging subgroup ID for the UE 702 based on the RRC state change for the UE 702. For example, the message may be a UE context modification message including the updated paging subgroup ID of the UE 702 based on the RRC state change for the UE 702, In one aspect, the UE context modification message may include a set of candidate subgroups associated with the RRC state change.

At 730, the base station 704 may determine to release the UE 702 into RRC inactive state. When the base station 704 is about to release the UE 702 into the RRC inactive state and determine that the current paging subgroup of the UE 702 may no longer be optimal for the new RRC state. Here, the releasing of the RRC connection with the UE 702 to the RRC inactive state is not notified to the AMF 706 until receiving an RRC inactive transition report from the base station 704.

At 732, the base station 704 may transmit a RAN paging assistance information to the core network including the AMF 706 based on the RRC state change for the UE 702. The AMF 706 may receive, from the base station 704, an indication about a change in the RRC connection with the UE 702 to an RRC idle state. The RAN paging assistance information indicates an expected paging probability of the UE 702. That is, the RAN paging assistance information may include the probability of the UE 702 receiving a paging message expected from the base station 704.

At 734, the AMF 706 may transmit, to the base station 704, a message including an indication of an updated paging subgroup ID of the UE 702 in response to receiving the indication from the base station 704. The base station 704 may receive, from the core network including AMF 706, the message including the indication of at least one updated paging subgroup ID for the UE 702 based on the RRC state change for the UE 702. For example, the message may be the UE context modification message including the updated paging subgroup ID of the UE 702 based on the RRC state change for the UE 730. The updated paging subgroup ID of the UE 702 may be associated with the change of the RRC connection with the UE 702 at 730.

In one aspect, the AMF 706 may configure a set of candidate subgroups for the UE 702 in the RRC inactive state during the initial paging subgroup assignment at 710 or the update of the paging subgroup of the UE 702 at 724. That is, when the AMF 706 assigns or updates a paging subgroup of the UE 702, the AMF 706 may also determine a set of candidate subgroups for the UE 702 in the RRC inactive state. After the AMF 706 configures a subgroup for UE 702, the AMF 706 may provide the information to base station 704. The AMF 706 may also choose to provide, to base station 704, the set of candidate subgroups for UE 702 in the RRC inactive state, for use in RRC inactive state. The base station 704 may receive the set of candidate subgroups from the AMF 706, and the before the base station 704 releases the RRC connection of the UE 702 to RRC inactive state, base station 704 has the option of assigning the UE 702 with a different subgroup selected from the set of candidate subgroup provided by the AMF 706. Accordingly, the base station 704 may have more control in which paging subgroup to use for the UE 702 in the RRC inactive state, based on its prediction on UE 702's paging characteristics, e.g., UPAI. The base station 704 may provide the updated paging subgroup ID to the UE 702 in the RRC release message, and the base station 704 may notify the AMF 706 of the UE 702's updated paging subgroup. For example, the base station 704 may transmit, to the AMF 706, the RRC inactive transition report including the updated paging subgroup of the UE 702.

At 736, the base station 704 may transmit, to the UE 702, an updated paging subgroup ID of the UE 702 based on a release of an RRC connection of the UE 702 to the RRC inactive state. The updated paging subgroup ID may be transmitted via the RRC release message. The UE 702 may receive the RRC release message instructing the UE 702 to enter the RRC inactive state. The RRC release message may include the paging subgroup ID of the UE 702. In one aspect, the updated paging subgroup ID of the UE 702 included in the RRC release may be received from the AMF 706 at 734 based on the RAN paging assistance information of 732. In another aspect, base station 704 may select the paging subgroup ID of the UE 702 from the set of candidate subgroups for the UE 702 received from the AMF 706 at 710 or 724.

At 738, the base station 704 may transmit, to the core network including the AMF 706, the updated paging subgroup ID of the UE 702, and the core network including the AMF 706 may receive, from the base station 704, the updated paging subgroup ID of the UE 702. The updated paging subgroup ID of the UE 702 may be transmitted to the AMF 706 of the core network including AMF 706 via the RRC inactive transition report.

At 740, the base station 704 and the AMF 706 may determine to release the UE 702 into the RRC idle state. When the base station 704 is about to release the UE 702 into the RRC idle state, the AMF 706 may determine to update the paging subgroup of the UE 702 if the AMF 706 anticipate a change in the paging probability in the UE 702 in the RRC idle state. As the AMF 706 is involved in the procedure of releasing the RRC connection to the RRC idle state, the AMF 706 may determine to update the paging subgroup of the UE 702.

At 742, the AMF 706 may transmit, to the base station 704, a message including an indication of the updated paging subgroup ID of the UE 702, and the base station 704 may receive, from the core network including AMF 706, the message including the indication of at least one subgroup ID for the UE 702 based on the RRC state change for the UE 702. For example, the message may be a UE context modification message including the indication of at least one subgroup ID for the UE 702 based on the RRC state change for the UE 702. That is, the AMF 706 may send the updated paging subgroup ID to base station 704 using the UE context modification message transmitted to base station 704.

At 744, the base station 704 may transmit, to the UE 702, the RRC release message instructing the UE 702 to enter the RRC idle state, and the UE 702 may receive the RRC release message instructing the UE 702 to enter the RRC idle state. The RRC release message may include the updated paging subgroup ID of the UE 702. That is, the base station 704 may provide the updated paging subgroup ID to the UE 702 in the RRC release message.

The core network including the AMF 706 may determine to transmit a paging message to the UE 702 associated with the updated paging subgroup.

At 750, the AMF 706 may transmit, to the base station 704, the paging notification associated with the paging subgroup ID, and the base station 704 may receive, from the core network including the AMF 706, the paging notification associated with the paging subgroup ID. That is, the AMF 706 may transmit, to the base station 704, a paging notification including the paging subgroup ID of the UE 702 and the paging message directed to the UE 702 associated with the paging subgroup ID, and the base station 704 may receive, from the AMF 706, the paging notification including the paging subgroup ID of the UE 702 and the paging message directed to the UE 702 associated with the paging subgroup ID.

At 752, the base station 704 may transmit, to the UE 702, a first paging indication based on the first paging notification in a first paging occasion associated with the paging subgroup ID of the UE 702. The UE 702 may receive, from the base station 704, the first paging indication based on the first paging notification in the first paging occasion associated with the paging subgroup ID of the UE 702. The first paging indication may indicate a single paging subgroup ID for the UE 702 in response to an indication of an RRC state change for the UE 702. Here, the first paging indication may refer to a paging PDCCH. The paging indication may include a PEI, and the paging indication may be transmitted in the paging occasion associated with the paging subgroup of the UE 702.

At 758, the base station 704 may transmit, to a plurality of UEs including the UE 702, system information indicating a number of the UE subgroups assigned by at least one of the core network including the AMF 706 or the base station 704. The UE 702 may receive, from a base station 704, system information indicating a number of the UE subgroups assigned by at least one of the core network including AMF 706 or the base station 704. In one aspect, the number of the UE 702 paging subgroups may include at least one of a total number of UE subgroups ($N_{total}$) or a number of UE subgroups assigned by the core network ($N_{CN}$) Here, $N_{RAN}=N_{total}-N_{CN}$ may represent the number of paging subgroups that do not support or are not assigned by core network.

In some aspects, a second UE of the plurality of UEs may not support the core network including the AMF 706 assigned paging subgrouping. The base station 704 may receive, from the core network including the AMF 706, a second paging notification including an indication that the second UE does not support subgrouping assigned by the core network including the AMF 706. The base station 704 may transmit, to the second UE of the plurality of UEs, a second paging indication in a second paging occasion associated with a paging subgroup ID based on a UE-ID of the second UE.

At 760, the UE 702 may monitor paging channel using the paging subgroup ID based on the UE 702 receiving an assignment of the paging subgroup ID and the paging subgroup ID being less than the number of the subgroups indicated in the system information. At 760, the UE 702 may monitor the paging occasion associated with the paging subgroup of the UE 702 for the paging indication from the base station 704, and the UE 702 may use the paging indication to receive the paging message (or a paging PDSCH) from the base station 704.

The UE 702 may monitor paging channel using the paging subgroup ID based on determining that the received assignment of the paging subgroup ID is properly supported by the number of the paging subgroups assigned by the core network. The UE 702 may determine that the received assignment of the paging subgroup ID is properly supported based on the system information received at 758.

In one aspect, the base station 704 may broadcast $N_{CN}$, and the UE 702 may determine that the paging subgroup is properly supported, or properly assigned, based on the paging subgroup ID being smaller than or equal to the $N_{CN}$ (paging subgroup ID≤$N_{CN}$). In another aspect, the base station 704 may broadcast $N_{RAN}$, and the UE 702 may determine that the paging subgroup is properly supported based on the paging subgroup ID being greater than the $N_{RAN}$ (paging subgroup ID>$N_{RAN}$). The UE 702 may use the paging subgroup ID to receive the paging messages by monitoring the paging occasions associated with the paging subgroup ID.

The second UE, different from the UE 702, may determine that the received assignment of the paging subgroup ID is not properly supported by the number of the paging subgroups assigned by the core network, the second UE may monitor one or more paging occasions associated with paging subgroup ID derived based on the UE-ID. In one aspect, the base station may broadcast $N_{CN}$, and the second UE may determine that the paging subgroup is not properly supported based on the paging subgroup ID being greater than the $N_{CN}$ (paging subgroup ID>$N_{CN}$). Accordingly, the second UE may derive the paging subgroup ID based on its UE-ID according to the following formula: UE-ID mod ($N_{RAN}+N_{CN}+1$). In another aspect, the base station may broadcast $N_{RAN}$, and the second UE may determine that the paging subgroup is not properly supported based on the paging subgroup ID being smaller than or equal to the $N_{RAN}$ (paging subgroup ID≤$N_{RAN}$). Accordingly, the second UE may derive the paging subgroup ID based on its UE-ID according to the following formula: UE-ID mod $N_{RAN}$. The second UE may monitor the paging occasions associated with the paging subgroup ID derived based on its UE-ID.

Figure 8:
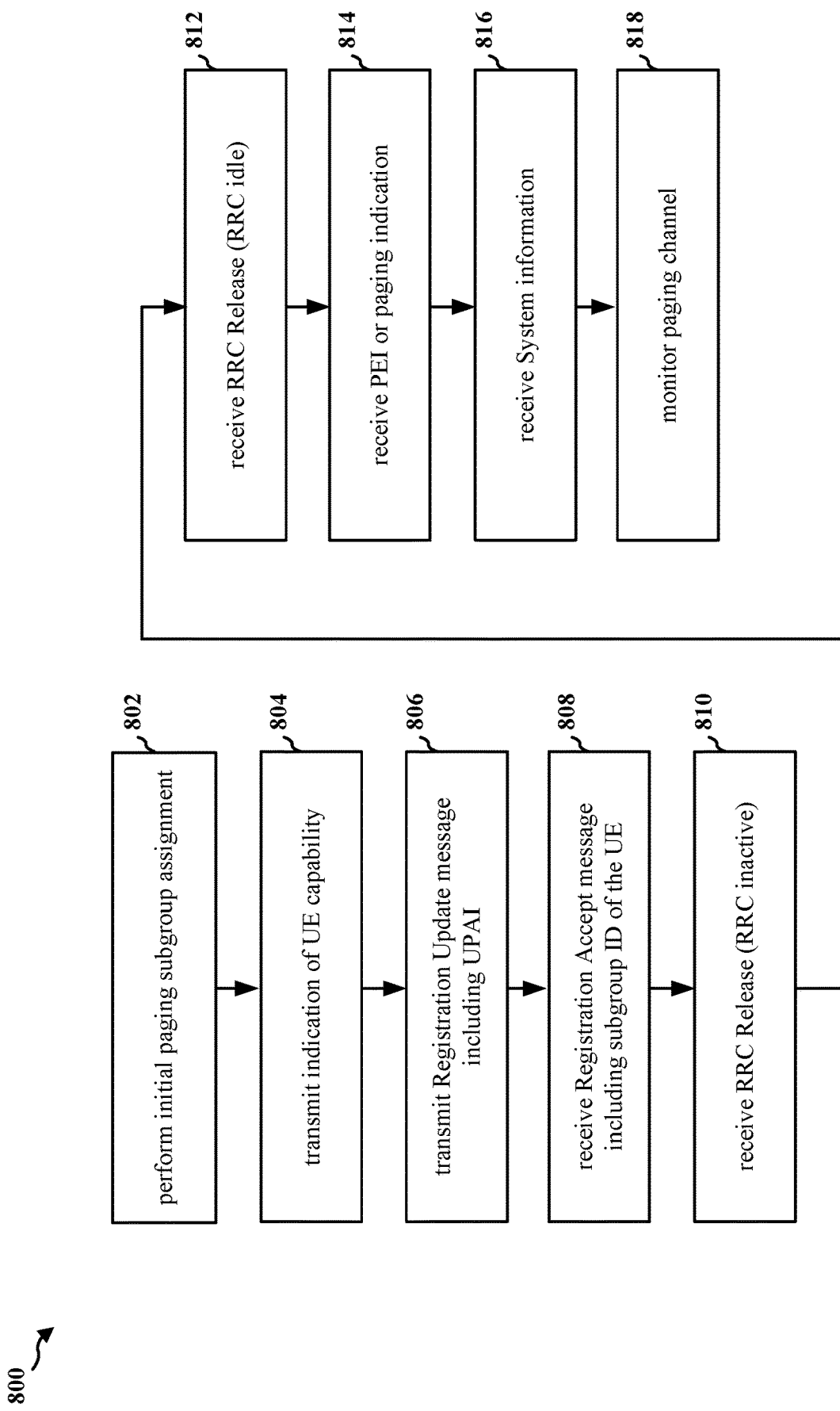
FIG. 8 is a flowchart of a method of wireless communication.

FIG. 8 is a flowchart 800 of a method of wireless communication. The method may be performed by a UE (e.g., the UE 104; the apparatus 1402). In some aspects, the UE may initiate assignment of the paging subgroup of the UE, and initiate an update of the paging subgroup assigned to the UE.

At 802, the UE may perform an initial paging subgroup assignment of the UE with the base station and the AMF. The UE may transmit the registration request message to the AMF, and the AMF may receive the registration request message from the UE. The AMF may return, to the base station, the UE's subgroup ID in a registration accept message transmitted in response to the registration request message received at 710. Furthermore, the UE context setup message transmitted to the base station may include a set of candidate subgroups associated with the UE. The UE may receive the paging subgroup ID of the UE in the registration accept message received from the AMF of the core network including the AMF. The AMF may transmit, to the base station, a UE context setup message including the paging subgroup ID of the UE, and the base station may receive the UE context setup message from the AMF. For example, at 710, the UE 702, the base station 704, and the AMF 706 may perform an initial paging subgroup assignment of the UE 702. Particularly, 802 may be performed by a paging subgroup managing component 1440.

At 804, the UE may transmit, to the network, an indication of UE capability indicating whether the UE supports the subgrouping assignment by the network. For example, the UE may use a NAS signaling to indicate the UE 702 capability to the AMF. The indication may be provided during the attach procedure or the registration request/ update procedures or messages. The AMF may determine the paging subgroup of the UE 702 based on the indication of the UE 702 capability. For example, at 712, the UE 702 may transmit, to the network, an indication of UE 702 capability indicating whether the UE 702 supports the subgrouping assignment by the network. Particularly, 804 may be performed by the paging subgroup managing component 1440.

At 806, the UE may transmit, to the AMF, a paging assistance information. That is, the UE 702 402 may transmit, to the AMF 706, the registration update message including the new UPAI to request the updated paging subgroup, and the AMF 706 may receive, from the UE 702, the registration update message including the new UPAI and determine the updated paging subgroup for the UE 702. The UPAI may include at least one of a paging probability, a mobility profile, or a power profile. The paging assistance information may be transmitted in one or more of a registration request message at 802 or the registration update message at 806. For example, at 720, the UE 702 may transmit, to the AMF 706, a paging assistance information. Particularly, 806 may be performed by the paging subgroup managing component 1440.

At 808, the UE may receive, from the core network including the AMF, the updated paging subgroup ID of the UE determined based on the paging assistance information. The updated paging subgroup ID may be received in the registration acceptance message from the core network including AMF. For example, at 722, the UE 702 may receive, from the core network including the AMF 706, the updated paging subgroup ID of the UE 702 determined based on the paging assistance information. Particularly, 808 may be performed by the paging subgroup managing component 1440.

At 810, The UE may receive the RRC release message instructing the UE to enter the RRC inactive state. The RRC release message may include the paging subgroup ID of the UE. In one aspect, the updated paging subgroup ID of the UE included in the RRC release may be received from the AMF based on the RAN paging assistance information transmitted by the base station. In another aspect, base station may select the paging subgroup ID of the UE rom the set of candidate subgroups for the UE received from the AMF. For example, at 736, the UE 702 may receive the RRC release message instructing the UE 702 to enter the RRC inactive state. Particularly, 810 may be performed by an RRC component 1442.

At 812, the UE may receive the RRC release message instructing the UE to enter the RRC idle state. The RRC release message may include the updated paging subgroup ID of the UE 702. That is, the base station may provide the updated paging subgroup ID to the UE in the RRC release message. For example, at 744, the UE 702 may receive the RRC release message instructing the UE 702 to enter the RRC idle state. Particularly, 812 may be performed by the RRC component 1442.

The core network including the AMF 706 may determine to transmit a paging message to the UE 702 associated with the updated paging subgroup.

At 814, the UE may receive, from the base station, the first paging indication based on the first paging notification in the first paging occasion associated with the paging subgroup ID of the UE. The first paging indication may indicate a single paging subgroup ID for the UE in response to an indication of an RRC state change for the UE. Here, the first paging indication may refer to a paging PDCCH. The paging indication may include a PEI, and the paging indication may be transmitted in the paging occasion associated with the paging subgroup of the UE. For example, at 752, the UE 702 may receive, from the base station 704, the first paging indication based on the first paging notification in the first paging occasion associated with the paging subgroup ID of the UE 702. Particularly, 814 may be performed by a paging message component 1444.

At 816, the UE may receive, from a base station, system information indicating a number of the UE subgroups assigned by at least one of the core network including AMF or the base station. In one aspect, the number of the UE paging subgroups may include at least one of a total number of UE subgroups ($N_{total}$) or a number of UE subgroups assigned by the core network ($N_{CN}$). Here, $N_{RAN}=N_{total}-N_{CN}$ may represent the number of paging subgroups that do not support or are not assigned by core network. For example, at 758, the UE 702 may receive, from a base station 704, system information indicating a number of the UE subgroups assigned by at least one of the core network including AMF 706 or the base station 704. Particularly, 816 may be performed by a network system information receiving component 1446.

In some aspects, a second UE of the plurality of UEs may not support the core network including the AMF assigned paging subgrouping. The base station may receive, from the core network including the AMF, a second paging notification including an indication that the second UE does not support subgrouping assigned by the core network including the AMF. The base station may transmit, to the second UE of the plurality of UEs, a second paging indication in a second paging occasion associated with a paging subgroup ID based on a UE-ID of the second UE.

At 818, the UE may monitor paging channel using the paging subgroup ID based on the UE receiving an assignment of the paging subgroup ID and the paging subgroup ID being less than the number of the subgroups indicated in the system information. The UE may monitor the paging occasion associated with the paging subgroup of the UE for the paging indication from the base station, and the UE may use the paging indication to receive the paging message (or a paging PDSCH) from the base station. For example, at 760, the UE 702 may monitor paging channel using the paging subgroup ID based on the UE 702 receiving an assignment of the paging subgroup ID and the paging subgroup ID being less than the number of the subgroups indicated in the system information. Particularly, 818 may be performed by the paging message component 1444.

The UE may monitor paging channel using the paging subgroup ID based on determining that the received assignment of the paging subgroup ID is properly supported by the number of the paging subgroups assigned by the core network. The UE may determine that the received assignment of the paging subgroup ID is properly supported based on the system information received at 816.

In one aspect, the base station may broadcast $N_{CN}$, and the UE may determine that the paging subgroup is properly supported, or properly assigned, based on the paging subgroup ID being smaller than or equal to the $N_{CN}$ (paging subgroup ID≤$N_{CN}$). In another aspect, the base station may broadcast $N_{RAN}$, and the UE may determine that the paging subgroup is properly supported based on the paging subgroup ID being greater than the $N_{RAN}$ (paging subgroup ID>$N_{RAN}$). The UE may use the paging subgroup ID to receive the paging messages by monitoring the paging occasions associated with the paging subgroup ID.

Figure 9:
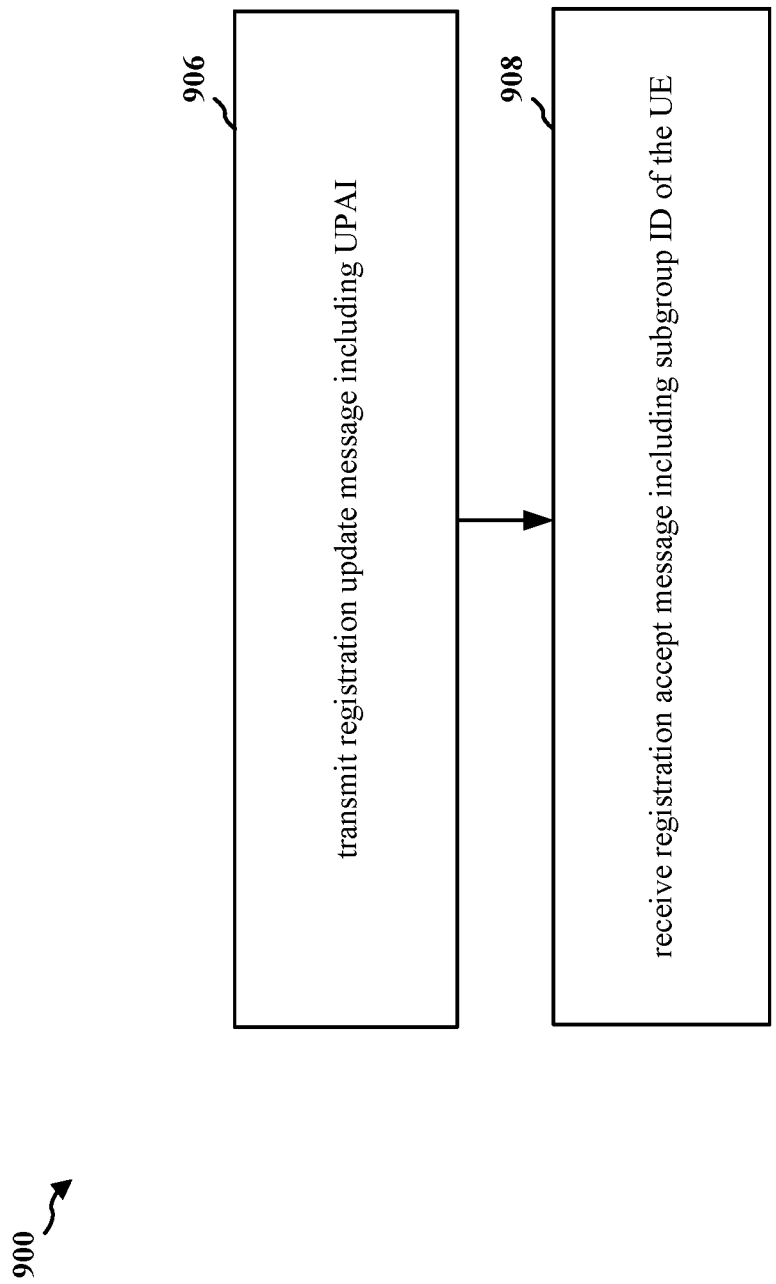
FIG. 9 is a flowchart of a method of wireless communication.

FIG. 9 is a flowchart 900 of a method of wireless communication. The method may be performed by a UE (e.g., the UE 104; the apparatus 1402). In some aspects, the UE may initiate assignment of the paging subgroup of the UE, and initiate an update of the paging subgroup assigned to the UE.

At 906, the UE may transmit, to the AMF, a paging assistance information. That is, the UE 702 402 may transmit, to the AMF 706, the registration update message including the new UPAI to request the updated paging subgroup, and the AMF 706 may receive, from the UE 702, the registration update message including the new UPAI and determine the updated paging subgroup for the UE 702. The UPAI may include at least one of a paging probability, a mobility profile, or a power profile. The paging assistance information may be transmitted in one or more of a registration request message at 902 or the registration update message at 906. For example, at 720, the UE 702 may transmit, to the AMF 706, a paging assistance information. Particularly, 906 may be performed by the paging subgroup managing component 1440.

At 908, the UE may receive, from the core network including the AMF, the updated paging subgroup ID of the UE determined based on the paging assistance information. The updated paging subgroup ID may be received in the registration acceptance message from the core network including AMF. For example, at 722, the UE 702 may receive, from the core network including the AMF 706, the updated paging subgroup ID of the UE 702 determined based on the paging assistance information. Particularly, 908 may be performed by the paging subgroup managing component 1440.

Figure 10:
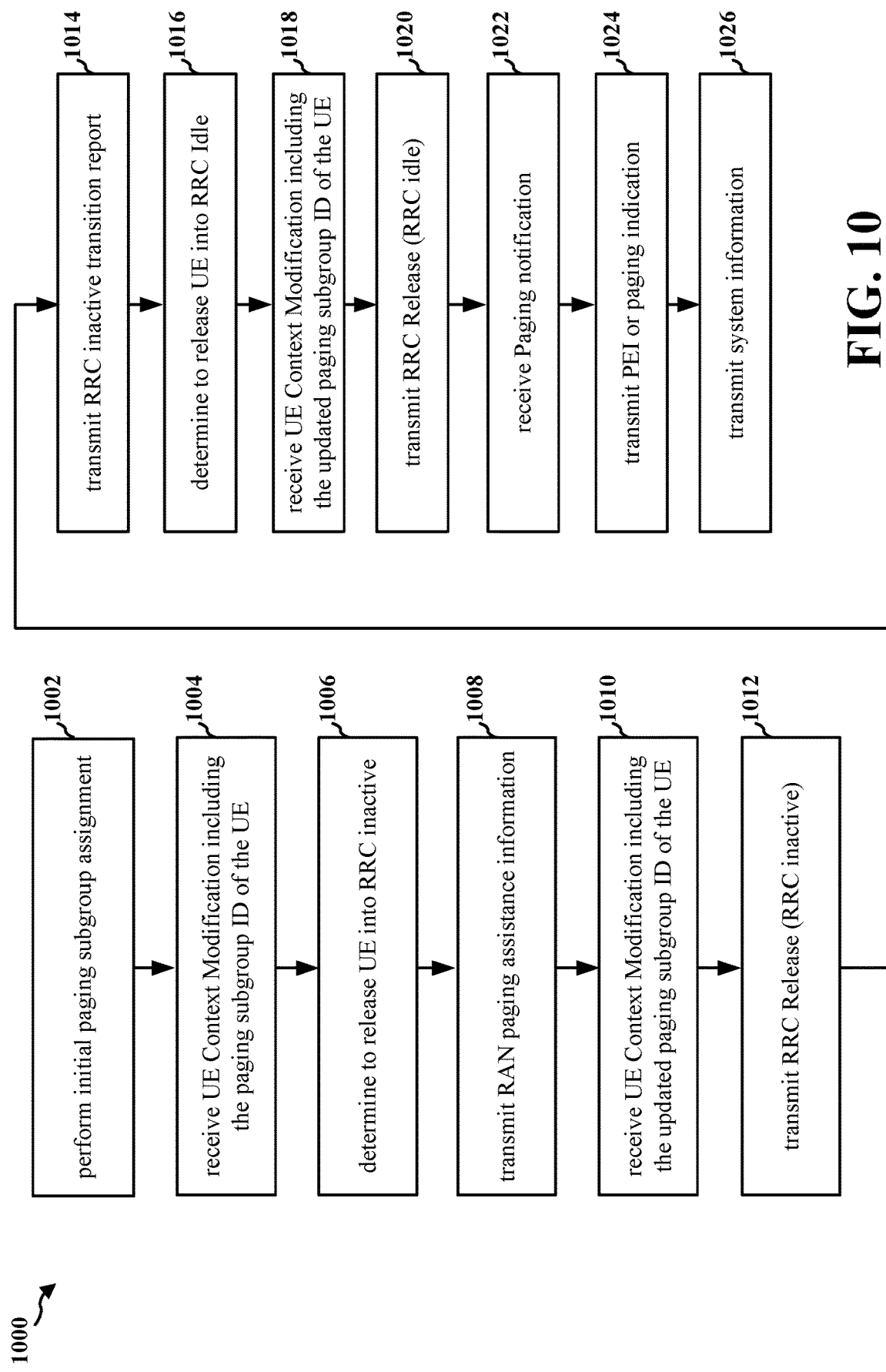
FIG. 10 is a flowchart of a method of wireless communication.

FIG. 10 is a flowchart 1000 of a method of wireless communication. The method may be performed by a base station (e.g., the base station 102/180; the apparatus 1502). The base station may initiate an update of the paging subgroup assigned to the UE based on the change of RRC connection between the UE and the base station.

At 1002, the base station may perform an initial paging subgroup assignment of the UE, with the UE and the AMF. The UE may transmit the registration request message to the AMF, and the AMF may receive the registration request message from the UE. The AMF may return, to the base station, the UE's subgroup ID in a registration accept message transmitted in response to the registration request message received at 710. Furthermore, the UE context setup message transmitted to the base station may include a set of candidate subgroups associated with the UE. The UE may receive the paging subgroup ID of the UE in the registration accept message received from the AMF of the core network including the AMF. The AMF may transmit, to the base station, a UE context setup message including the paging subgroup ID of the UE, and the base station may receive the UE context setup message from the AMF. For example, at 710, the UE 702, the base station 704, and the AMF 706 may perform an initial paging subgroup assignment of the UE 702. Particularly, 1002 may be performed by a paging subgroup managing component 1540.

At 1004, the base station may receive, from the core network including AMF, the UE context modification message including the indication of at least one updated paging subgroup ID for the UE based on the RRC state change for the UE. In one aspect, the UE context modification message may include a set of candidate subgroups associated with the RRC state change. For example, at 724, the base station 704 may receive, from the core network including AMF 706, the UE context modification message including the indication of at least one updated paging subgroup ID for the UE 702 based on the RRC state change for the UE 702. Particularly, 1004 may be performed by the paging subgroup managing component 1540.

At 1006, the base station may determine to release the UE into RRC inactive state. When the base station is about to release the UE into the RRC inactive state and determine that the current paging subgroup of the UE may no longer be optimal for the new RRC state. Here, the releasing of the RRC connection with the UE to the RRC inactive state is not notified to the AMF until receiving an RRC inactive transition report from the base station. For example, at 730, the base station 704 may determine to release the UE 702 into RRC inactive state. Particularly, 1006 may be performed by the paging subgroup managing component 1540.

At 1008, the base station may transmit a RAN paging assistance information to the core network including the AMF based on the RRC state change for the UE. The RAN paging assistance information indicates an expected paging probability of the UE. That is, the RAN paging assistance information may include the probability of the UE receiving a paging message expected from the base station. For example, at 732, the base station 704 may transmit a RAN paging assistance information to the core network including the AMF 706 based on the RRC state change for the UE 702. Particularly, 1008 may be performed by the paging subgroup managing component 1540.

At 1010, the base station may receive, from the core network including AMF, the UE context modification message including the indication of at least one updated paging subgroup ID for the UE based on the RRC state change for the UE. The updated paging subgroup ID of the UE may be associated with the change of the RRC connection with the UE at 1006. For example, at 734, the base station 704 may receive, from the core network including AMF 706, the UE context modification message including the indication of at least one updated paging subgroup ID for the UE 702 based on the RRC state change for the UE 702. Particularly, 1010 may be performed by the paging subgroup managing component 1540.

In one aspect, the AMF may configure a set of candidate subgroups for the UE in the RRC inactive state during the initial paging subgroup assignment at 1002 or the update of the paging subgroup of the UE at 1004. That is, when the AMF assigns or updates a paging subgroup of the UE, the AMF may also determine a set of candidate subgroups for the UE in the RRC inactive state. After the AMF configures a subgroup for UE, the AMF may provide the information to base station. The AMF may also choose to provide, to base station, the set of candidate subgroups for UE in the RRC inactive state, for use in RRC inactive state. The base station may receive the set of candidate subgroups from the AMF, and the before the base station releases the RRC connection of the UE to RRC inactive state, base station has the option of assigning the UE with a different subgroup selected from the set of candidate subgroup provided by the AMF. Accordingly, the base station may have more control in which paging subgroup to use for the UE in the RRC inactive state, based on its prediction on UE's paging characteristics, e.g., UPAI. The base station may provide the updated paging subgroup ID to the UE in the RRC release message, and the base station may notify the AMF of the UE's updated paging subgroup. For example, the base station may transmit, to the AMF, the RRC inactive transition report including the updated paging subgroup of the UE.

At 1012, the base station may transmit, to the UE, an updated paging subgroup ID of the UE based on a release of an RRC connection of the UE to the RRC inactive state. The updated paging subgroup ID may be transmitted via the RRC release message. The UE may receive the RRC release message instructing the UE to enter the RRC inactive state. The RRC release message may include the paging subgroup ID of the UE. In one aspect, the updated paging subgroup ID of the UE included in the RRC release may be received from the AMF at 1010 based on the RAN paging assistance information of 1008. In another aspect, base station may select the paging subgroup ID of the UE from the set of candidate subgroups for the UE received from the AMF at 1002 or 1004. For example, at 736, the base station 704 may transmit, to the UE 702, an updated paging subgroup ID of the UE 702 based on a release of an RRC connection of the UE 702 to the RRC inactive state. Particularly, 1012 may be performed by an RRC component 1542.

At 1014, the base station may transmit, to the core network including the AMF, the updated paging subgroup ID of the UE. The updated paging subgroup ID of the UE may be transmitted to the AMF 706 of the core network including AMF via the RRC inactive transition report. For example, at 738, the base station 704 may transmit, to the core network including the AMF 706, the updated paging subgroup ID of the UE 702. Particularly, 1014 may be performed by the RRC component 1542.

At 1016, the base station and the AMF may determine to release the UE into the RRC idle state. When the base station is about to release the UE into the RRC idle state, the AMF may determine to update the paging subgroup of the UE if the AMF anticipate a change in the paging probability in the UE in the RRC idle state. As the AMF is involved in the procedure of releasing the RRC connection to the RRC idle state, the AMF may determine to update the paging subgroup of the UE. For example, at 740, the base station 704 and the AMF 706 may determine to release the UE 702 into the RRC idle state. Particularly, 1016 may be performed by the RRC component 1542.

At 1018, The base station may receive, from the core network including AMF, the UE context modification message including the indication of at least one subgroup ID for the UE based on the RRC state change for the UE. That is, the AMF 706 may send the updated paging subgroup ID to base station using the UE context modification message transmitted to base station. For example, at 742, The base station 704 may receive, from the core network including AMF 706, the UE context modification message including the indication of at least one subgroup ID for the UE 702 based on the RRC state change for the UE 702. Particularly, 1018 may be performed by the paging subgroup managing component 1540.

At 1020, the base station may transmit, to the UE, the RRC release message instructing the UE to enter the RRC idle state. The RRC release message may include the updated paging subgroup ID of the UE. That is, the base station 704 may provide the updated paging subgroup ID to the UE 702 in the RRC release message. For example, at 744, the base station 704 may transmit, to the UE 702, the RRC release message instructing the UE 702 to enter the RRC idle state. Particularly, 1020 may be performed by the RRC component 1542.

The core network including the AMF 706 may determine to transmit a paging message to the UE 702 associated with the updated paging subgroup.

At 1022, the base station may receive, from the core network including the AMF, the paging notification associated with the paging subgroup ID. That is, the AMF may transmit, to the base station, a paging notification including the paging subgroup ID of the UE and the paging message directed to the UE associated with the paging subgroup ID, and the base station may receive, from the AMF, the paging notification including the paging subgroup ID of the UE and the paging message directed to the UE associated with the paging subgroup ID. For example, at 750, the base station 704 may receive, from the core network including the AMF 706, the paging notification associated with the paging subgroup ID. Particularly, 1022 may be performed by a paging message component 1544.

At 1024, the base station may transmit, to the UE, a first paging indication based on the first paging notification in a first paging occasion associated with the paging subgroup ID of the UE. The first paging indication may indicate a single paging subgroup ID for the UE in response to an indication of an RRC state change for the UE. Here, the first paging indication may refer to a paging PDCCH. The paging indication may include a PEI, and the paging indication may be transmitted in the paging occasion associated with the paging subgroup of the UE. For example, at 752, the base station 704 may transmit, to the UE 702, a first paging indication based on the first paging notification in a first paging occasion associated with the paging subgroup ID of the UE 702. Particularly, 1024 may be performed by the paging message component 1544.

At 1026, the base station may transmit, to a plurality of UEs including the UE, system information indicating a number of the UE subgroups assigned by at least one of the core network including the AMF or the base station. In one aspect, the number of the UE 702 paging subgroups may include at least one of a total number of UE subgroups ($N_{total}$) or a number of UE subgroups assigned by the core network ($N_{CN}$). Here, $N_{RAN}=N_{total}-N_{CN}$ may represent the number of paging subgroups that do not support or are not assigned by core network. For example, at 758, the base station 704 may transmit, to a plurality of UEs including the UE 702, system information indicating a number of the UE subgroups assigned by at least one of the core network including the AMF 706 or the base station 704. Particularly, 1026 may be performed by a system information broadcasting component 1546.

In some aspects, a second UE of the plurality of UEs may not support the core network including the AMF assigned paging subgrouping. The base station may receive, from the core network including the AMF, a second paging notification including an indication that the second UE does not support subgrouping assigned by the core network including the AMF. The base station may transmit, to the second UE of the plurality of UEs, a second paging indication in a second paging occasion associated with a paging subgroup ID based on a UE-ID of the second UE.

The second UE, different from the UE 702, may determine that the received assignment of the paging subgroup ID is not properly supported by the number of the paging subgroups assigned by the core network, the second UE may monitor one or more paging occasions associated with paging subgroup ID derived based on the UE-ID. In one aspect, the base station may broadcast $N_{CN}$, and the second UE may determine that the paging subgroup is not properly supported based on the paging subgroup ID being greater than the $N_{CN}$ (paging subgroup ID>$N_{CN}$). Accordingly, the second UE may derive the paging subgroup ID based on its UE-ID according to the following formula: UE-ID mod ($N_{RAN}+N_{CN}+1$). In another aspect, the base station may broadcast $N_{RAN}$, and the second UE may determine that the paging subgroup is not properly supported based on the paging subgroup ID being smaller than or equal to the $N_{RAN}$ (paging subgroup ID≤$N_{RAN}$). Accordingly, the second UE may derive the paging subgroup ID based on its UE-ID according to the following formula: UE-ID mod $N_{RAN}$. The second UE may monitor the paging occasions associated with the paging subgroup ID derived based on its UE-ID.

Figure 11:
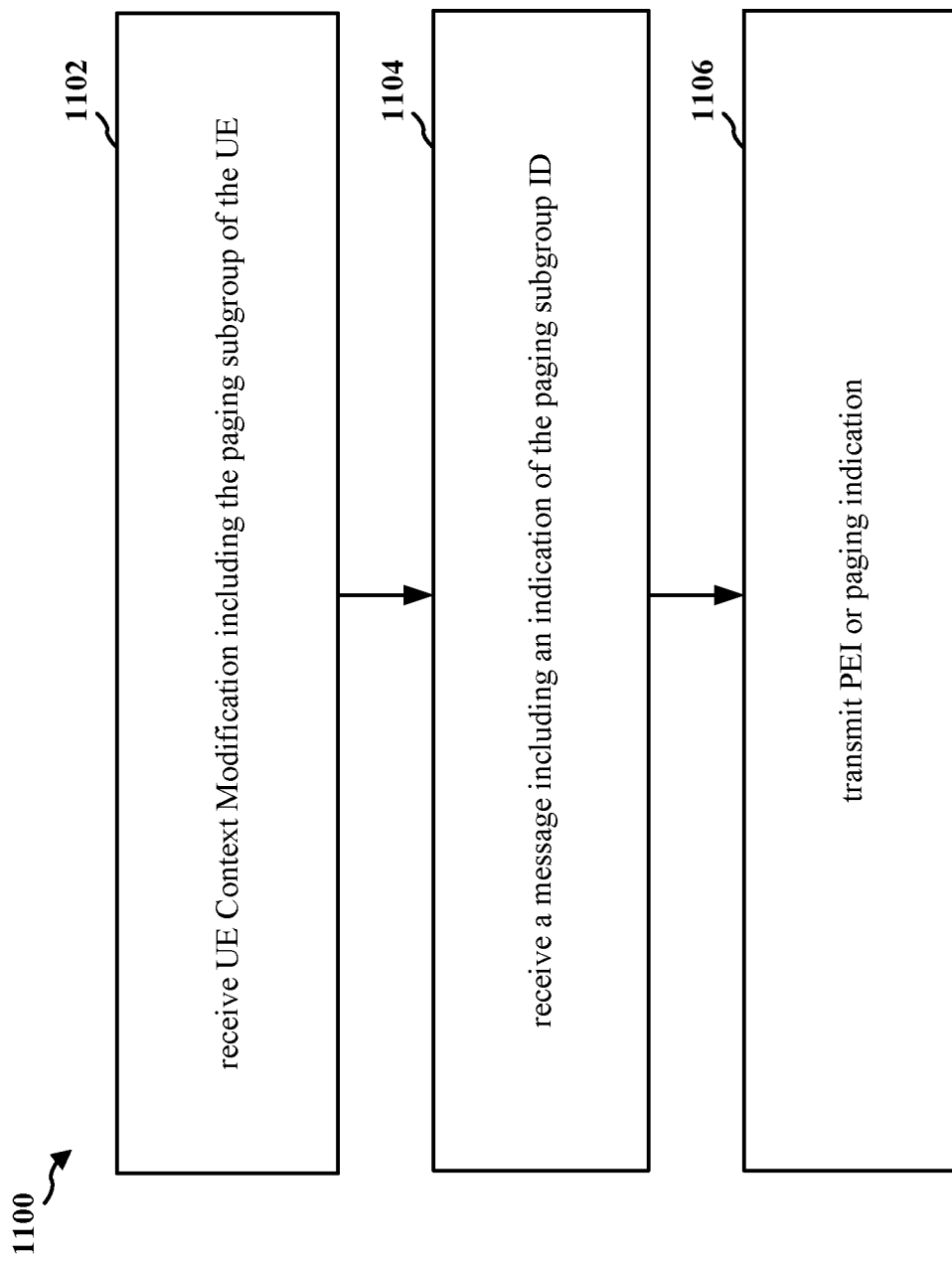
FIG. 11 is a flowchart of a method of wireless communication.

FIG. 11 is a flowchart 1100 of a method of wireless communication. The method may be performed by a base station (e.g., the base station 112/180; the apparatus 1502). The base station may initiate an update of the paging subgroup assigned to the UE based on the change of RRC connection between the UE and the base station.

At 1102, the base station may perform an initial paging subgroup assignment of the UE, with the UE and the AMF. The UE may transmit the registration request message to the AMF, and the AMF may receive the registration request message from the UE. The AMF may return, to the base station, the UE's subgroup ID in a registration accept message transmitted in response to the registration request message received at 710. Furthermore, the UE context setup message transmitted to the base station may include a set of candidate subgroups associated with the UE. The UE may receive the paging subgroup ID of the UE in the registration accept message received from the AMF of the core network including the AMF. The AMF may transmit, to the base station, a UE context setup message including the paging subgroup ID of the UE, and the base station may receive the UE context setup message from the AMF. For example, at 710, the UE 702, the base station 704, and the AMF 706 may perform an initial paging subgroup assignment of the UE 702. Particularly, 1102 may be performed by a paging subgroup managing component 1540.

At 1104, the base station may receive, from the core network including AMF, the UE context modification message including the indication of at least one updated paging subgroup ID for the UE based on the RRC state change for the UE. In one aspect, the UE context modification message may include a set of candidate subgroups associated with the RRC state change. For example, at 724, the base station 704 may receive, from the core network including AMF 706, a message including an indication of the paging subgroup ID of the UE 702 based on the RRC state change for the UE 702. Particularly, 1104 may be performed by the paging subgroup managing component 1540.

At 1106, the base station may determine to release the UE into RRC inactive state. When the base station is about to release the UE into the RRC inactive state and determine that the current paging subgroup of the UE may no longer be optimal for the new RRC state. Here, the releasing of the RRC connection with the UE to the RRC inactive state is not notified to the AMF until receiving an RRC inactive transition report from the base station. For example, at 730, the base station 704 may determine to release the UE 702 into RRC inactive state. Particularly, 1106 may be performed by the paging subgroup managing component 1540.

Figure 12:
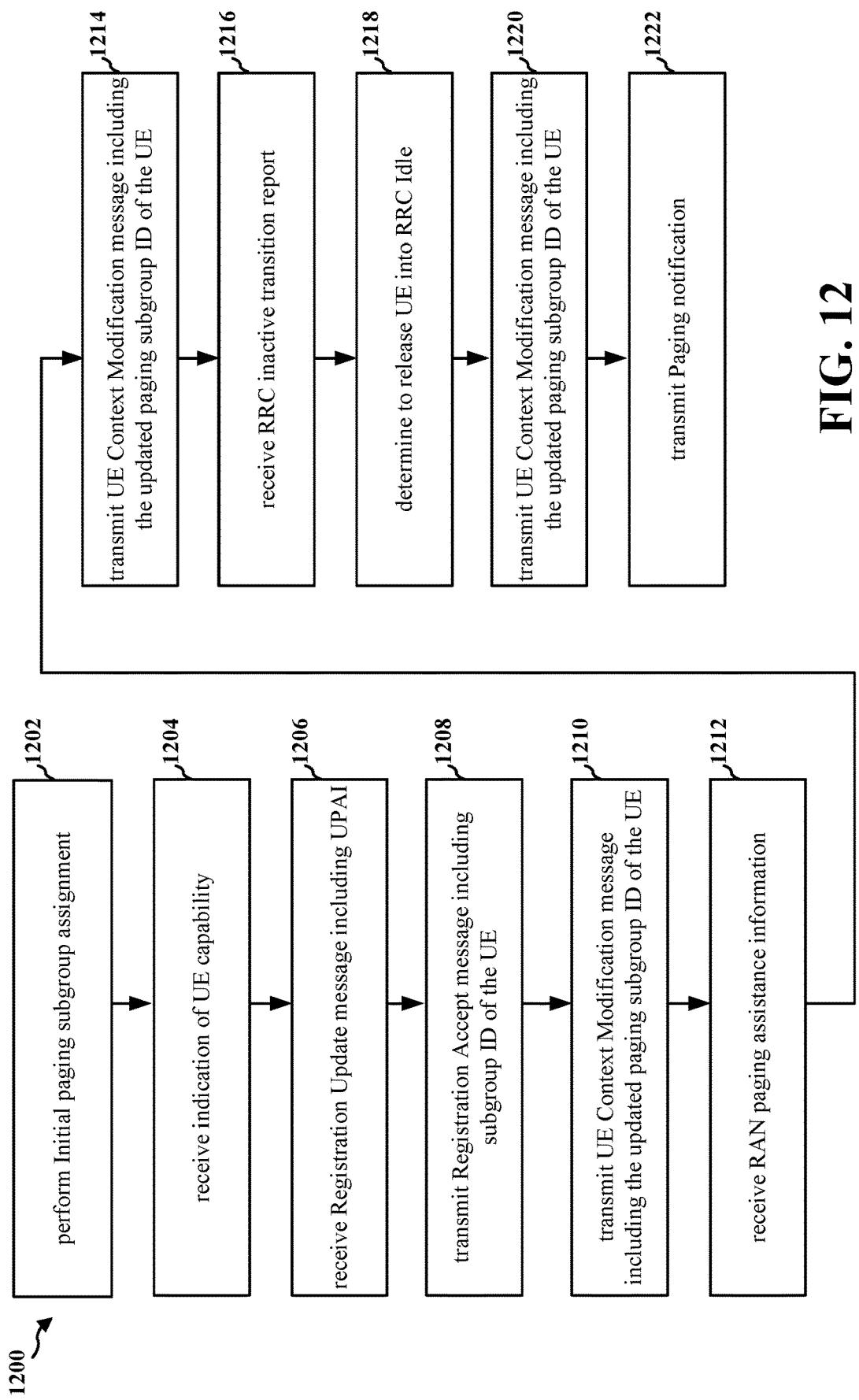
FIG. 12 is a flowchart of a method of wireless communication.

FIG. 12 is a flowchart 1200 of a method of wireless communication. The method may be performed by a core network (e.g., the core network 190; the apparatus 1602). The core network including the AMF may configure a set of candidate subgroups associated with the UE, and the base station may update the paging subgroup of the UE based on releasing the RRC connection between the UE and the base station to the RRC inactive state.

At 1202, the AMF may perform an initial paging subgroup assignment of the UE with the UE and the base station. The UE may transmit the registration request message to the AMF, and the AMF may receive the registration request message from the UE. The AMF may return, to the base station, the UE's subgroup ID in a registration accept message transmitted in response to the registration request message received at 710. Furthermore, the UE context setup message transmitted to the base station may include a set of candidate subgroups associated with the UE. The UE may receive the paging subgroup ID of the UE in the registration accept message received from the AMF of the core network including the AMF. The AMF may transmit, to the base station, a UE context setup message including the paging subgroup ID of the UE, and the base station may receive the UE context setup message from the AMF. For example, at 710, the UE 702, the base station 704, and the AMF 706 may perform an initial paging subgroup assignment of the UE 702. Particularly, 1202 may be performed by a paging subgroup managing component 1640.

At 1204, The AMF may receive, from the UE, the indication of the UE capability indicating whether the UE supports the subgrouping assignment by the network. The AMF may determine the paging subgroup of the UE based on the indication of the UE capability. For example, the UE may use an NAS signaling to indicate the UE capability to the AMF. The indication may be provided during the attach procedure or the registration request/update procedures or messages. For example, at 712, the AMF 706 may receive, from the UE 702, the indication of the UE 702 capability indicating whether the UE 702 supports the subgrouping assignment by the network. Particularly, 1204 may be performed by the paging subgroup managing component 1640.

At 1206, the AMF may receive the UPAI for the UE. That is, the UE may transmit, to the AMF, the registration update message including the new UPAI to request the updated paging subgroup, and the AMF may receive, from the UE, the registration update message including the new UPAI and determine the updated paging subgroup for the UE. The UPAI may include at least one of a paging probability, a mobility profile, or a power profile. The paging assistance information may be transmitted in one or more of a registration request message at 1202 or the registration update message at 1206. For example, at 720, the AMF 706 may receive the UPAI for the UE 702. Particularly, 1206 may be performed by the paging subgroup managing component 1640.

At 1208, the AMF may transmit an updated paging subgroup ID of the UE determined based on the paging assistance information. The updated paging subgroup ID may be received in the registration acceptance message from the core network including AMF. For example, at 722, the AMF 706 may transmit an updated paging subgroup ID of the UE 702 determined based on the paging assistance information. Particularly, 1208 may be performed by the paging subgroup managing component 1640.

At 1210, the AMF may transmit, to a base station, a UE context setup message including the updated paging subgroup ID of the UE based on the RRC state change for the UE. In one aspect, the UE context modification message may include a set of candidate subgroups associated with the RRC state change. For example, at 724, the AMF 706 may transmit, to a base station 704, a UE context setup message including the updated paging subgroup ID of the UE 702 based on the RRC state change for the UE 702. Particularly, 1210 may be performed by the paging subgroup managing component 1640.

At 1212, the AMF may receive, from the base station, an indication about a change in the RRC connection with the UE to the RRC idle state. The RAN paging assistance information indicates an expected paging probability of the UE. That is, the RAN paging assistance information may include the probability of the UE receiving a paging message expected from the base station. For example, at 732, the AMF 706 may receive, from the base station 704, an indication about a change in the RRC connection with the UE 702 to an RRC idle state. Particularly, 1212 may be performed by the paging subgroup managing component 1640.

At 1214, the AMF may transmit, to the base station, an updated paging subgroup ID of the UE in response to receiving the indication from the base station. The updated paging subgroup ID of the UE may be associated with the change of the RRC connection with the UE. For example, at 734, the AMF 706 may transmit, to the base station 704, an updated paging subgroup ID of the UE 702 in response to receiving the indication from the base station 704. Particularly, 1214 may be performed by the paging subgroup managing component 1640.

In one aspect, the AMF may configure a set of candidate subgroups for the UE in the RRC inactive state during the initial paging subgroup assignment at 1202 or the update of the paging subgroup of the UE at 1210. That is, when the AMF assigns or updates a paging subgroup of the UE, the AMF may also determine a set of candidate subgroups for the UE in the RRC inactive state. After the AMF configures a subgroup for UE, the AMF may provide the information to base station. The AMF may also choose to provide, to base station, the set of candidate subgroups for UE in the RRC inactive state, for use in RRC inactive state. The base station may receive the set of candidate subgroups from the AMF, and the before the base station releases the RRC connection of the UE to RRC inactive state, base station has the option of assigning the UE with a different subgroup selected from the set of candidate subgroup provided by the AMF. Accordingly, the base station may have more control in which paging subgroup to use for the UE in the RRC inactive state, based on its prediction on UE's paging characteristics, e.g., UPAI. The base station may provide the updated paging subgroup ID to the UE in the RRC release message, and the base station may notify the AMF of the UE's updated paging subgroup. For example, the base station may transmit, to the AMF, the RRC inactive transition report including the updated paging subgroup of the UE.

At 1216, the core network including the AMF may receive, from the base station, the updated paging subgroup ID of the UE. The updated paging subgroup ID of the UE may be transmitted to the AMF 706 of the core network including AMF 706 via the RRC inactive transition report. For example, at 738, the core network including the AMF 706 may receive, from the base station 704, the updated paging subgroup ID of the UE 702. Particularly, 1216 may be performed by an RRC component 1642.

At 1218, the base station and the AMF may determine to release the UE into the RRC idle state. When the base station is about to release the UE into the RRC idle state, the AMF may determine to update the paging subgroup of the UE if the AMF anticipate a change in the paging probability in the UE in the RRC idle state. As the AMF is involved in the procedure of releasing the RRC connection to the RRC idle state, the AMF may determine to update the paging subgroup of the UE. For example, at 740, the base station 704 and the AMF 706 may determine to release the UE 702 into the RRC idle state. Particularly, 1218 may be performed by the RRC component 1642.

At 1220, the AMF may transmit, to the base station, the UE context modification message including the indication of at least one subgroup ID for the UE based on the RRC state change for the UE. That is, the AMF may send the updated paging subgroup ID to base station using the UE context modification message transmitted to base station. For example, at 742, the AMF 706 may transmit, to the base station 704, the UE context modification message including the indication of at least one subgroup ID for the UE 702 based on the RRC state change for the UE 702. Particularly, 1220 may be performed by the paging subgroup managing component 1640.

The core network including the AMF 706 may determine to transmit a paging message to the UE 702 associated with the updated paging subgroup.

At 1222, the AMF may transmit, to the base station, the paging notification associated with the paging subgroup ID. That is, the AMF 706 may transmit, to the base station 704, a paging notification including the paging subgroup ID of the UE and the paging message directed to the UE associated with the paging subgroup ID, and the base station may receive, from the AMF, the paging notification including the paging subgroup ID of the UE and the paging message directed to the UE associated with the paging subgroup ID. For example, at 750, the AMF 706 may transmit, to the base station 704, the paging notification associated with the paging subgroup ID. Particularly, 1222 may be performed by the paging message component 1644.

Figure 13:
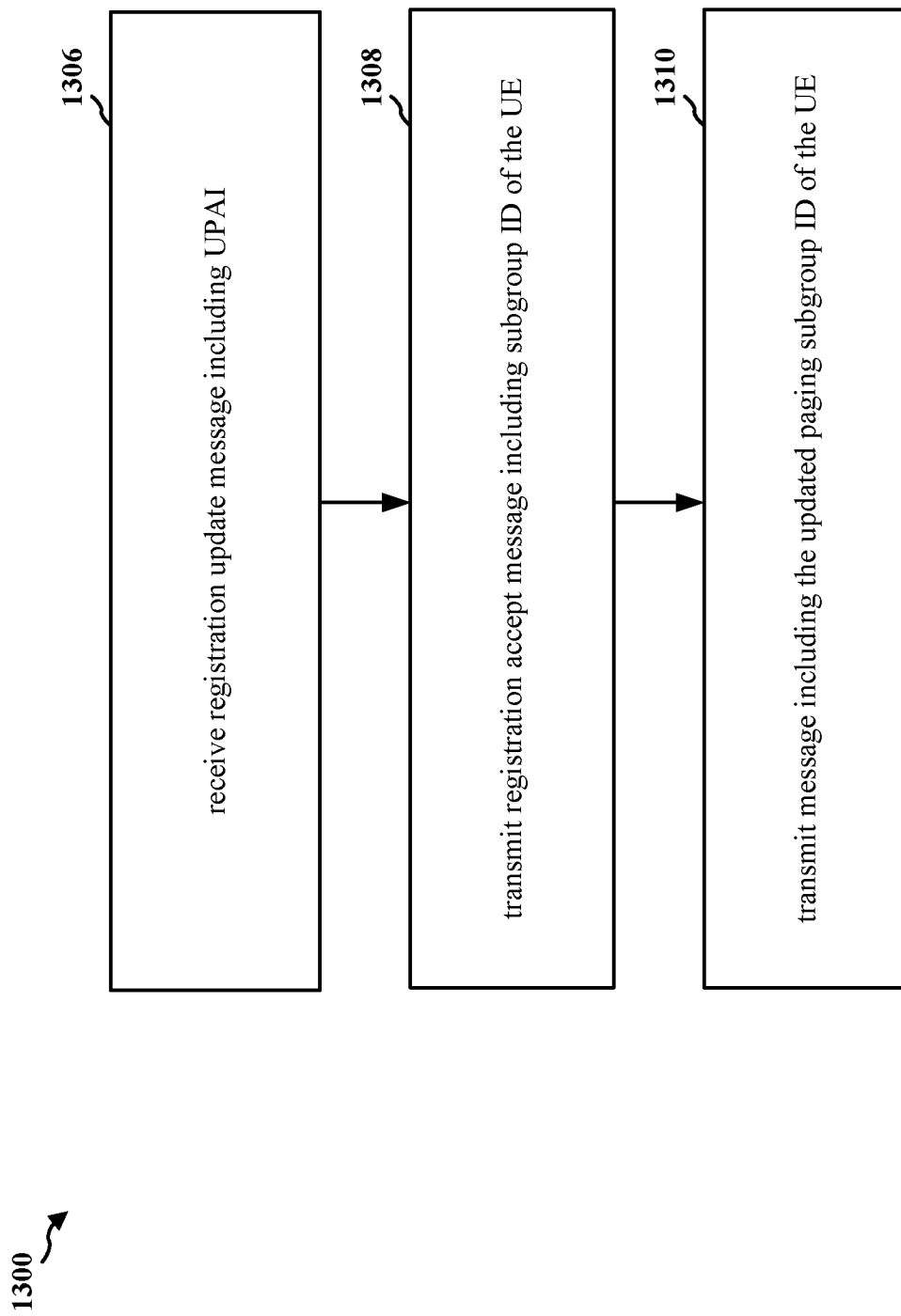
FIG. 13 is a flowchart of a method of wireless communication.

FIG. 13 is a flowchart 1300 of a method of wireless communication. The method may be performed by a core network (e.g., the core network 190; the apparatus 1602). The core network including the AMF may configure a set of candidate subgroups associated with the UE, and the base station may update the paging subgroup of the UE based on releasing the RRC connection between the UE and the base station to the RRC inactive state.

At 1306, the AMF may receive the UPAI for the UE 702. That is, the UE may transmit, to the AMF, the registration update message including the new UPAI to request the updated paging subgroup, and the AMF may receive, from the UE, the registration update message including the new UPAI and determine the updated paging subgroup for the UE. The UPAI may include at least one of a paging probability, a mobility profile, or a power profile. The paging assistance information may be transmitted in one or more of a registration request message at 1302 or the registration update message at 1306. For example, at 720, the AMF 706 may receive the UPAI for the UE 702. Particularly, 1306 may be performed by the paging subgroup managing component 1640.

At 1308, the AMF may transmit an updated paging subgroup ID of the UE determined based on the paging assistance information. The updated paging subgroup ID may be received in the registration acceptance message from the core network including AMF. For example, at 722, the AMF 706 may transmit an updated paging subgroup ID of the UE 702 determined based on the paging assistance information. Particularly, 1308 may be performed by the paging subgroup managing component 1640.

At 1310, the AMF may transmit, to a base station, a UE context setup message including the updated paging subgroup ID of the UE based on the RRC state change for the UE. In one aspect, the UE context modification message may include a set of candidate subgroups associated with the RRC state change. For example, at 724, the AMF 706 may transmit, to a base station 704, a UE context setup message including the updated paging subgroup ID of the UE 702 based on the RRC state change for the UE 702. Particularly, 1310 may be performed by the paging subgroup managing component 1640.

Figure 14:
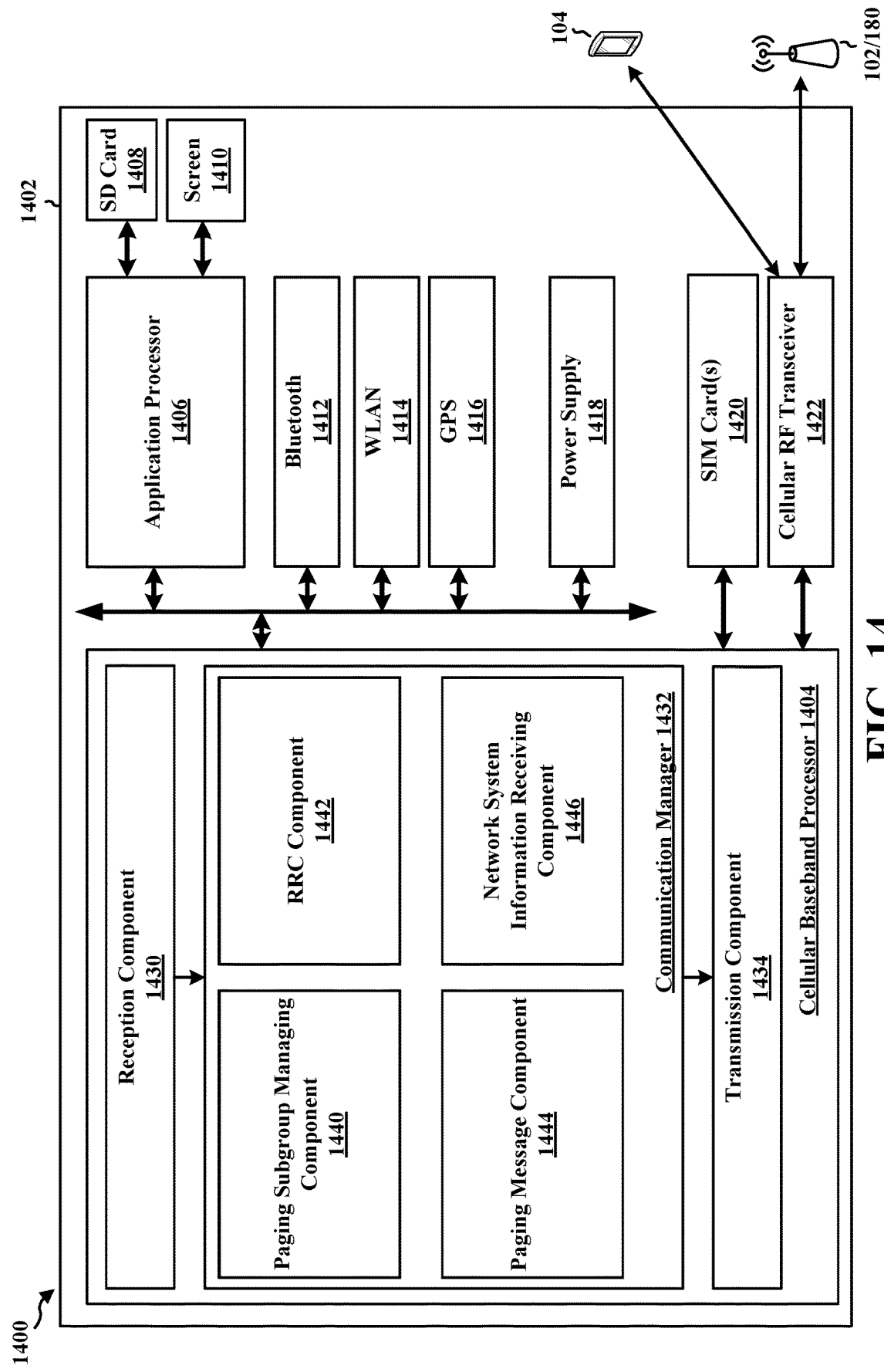
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a paging subgroup managing component 1440 that is configured to perform an initial paging subgroup assignment of the UE with the base station and the AMF, transmit an indication of UE capability indicating whether the UE supports the subgrouping assignment by the network, transmit a paging assistance information, and receive the updated paging subgroup ID of the UE determined based on the paging assistance information, e.g., as described in connection with 802, 804, 806, 808, 906, and 908. The communication manager 1432 further includes an RRC component 1442 that is configured to receive the RRC release message instructing the UE to enter the RRC inactive state, and receive the RRC release message instructing the UE to enter the RRC idle state, e.g., as described in connection with 810 and 812. The communication manager 1432 further includes a paging message component 1444 that is configured to receive the first paging indication based on the first paging notification in the first paging occasion associated with the paging subgroup ID of the UE, and monitor paging channel using the paging subgroup ID based on the UE receiving an assignment of the paging subgroup ID and the paging subgroup ID being less than the number of the subgroups indicated in the system information, e.g., as described in connection with 814 and 818. The communication manager 1432 further includes a network system information receiving component 1446 that is configured to receive system information indicating a number of the UE subgroups assigned by at least one of the core network including AMF or the base station, e.g., as described in connection with 816.

The apparatus may include additional components that perform each of the blocks of the algorithm in the flowcharts of FIGS. 7, 8, and 9. As such, each block in the flowcharts of FIGS. 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for transmitting, to a network, a paging assistance information, and means for receiving, from the network, a subgroup ID of the UE determined based on the paging assistance information. The apparatus 1402 includes means for transmitting the paging assistance information in one or more of a registration request message or a registration update message. The apparatus 1402 includes means for receiving, from a base station, system information indicating a number of the UE subgroups assigned by at least one of the network or the base station, and means for monitoring paging channel using the subgroup ID based on the UE receiving an assignment of the subgroup ID and the subgroup ID being less than the number of the subgroups indicated in the system information. The apparatus 1402 includes means for transmitting, to the network, a UE capability indicating whether the UE supports subgrouping assigned by the network. The means may be one or more of the components of the apparatus 1402 configured to perform the functions recited by the means. As described supra, the apparatus 1402 may include the TX processor 368, the RX processor 356, and the controller/processor 359. As such, in one configuration, the means may be the TX processor 368, the RX processor 356, and the controller/processor 359 configured to perform the functions recited by the means.

Figure 15:
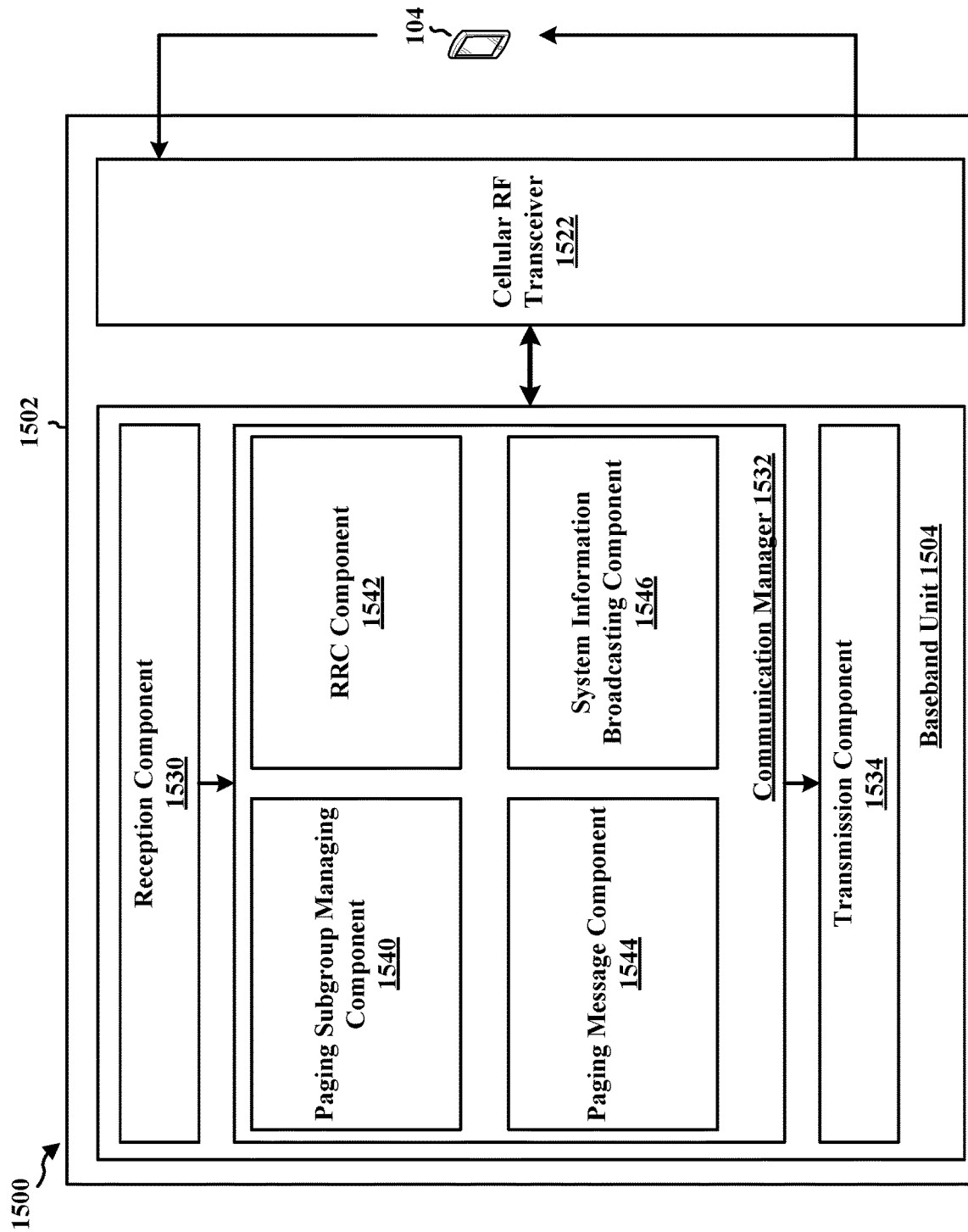
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1402 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a paging subgroup managing component 1540 that is configured to perform an initial paging subgroup assignment of the UE, with the UE and the AMF, receive the UE context modification message including the indication of at least one updated paging subgroup ID for the UE based on the RRC state change for the UE, determine to release the UE into RRC inactive state, transmit a RAN paging assistance information to the core network including the AMF based on the RRC state change for the UE, receive the UE context modification message including the indication of at least one updated paging subgroup ID for the UE based on the RRC state change for the UE, and receive the UE context modification message including the indication of at least one subgroup ID for the UE based on the RRC state change for the UE, e.g., as described in connection with 1002, 1004, 1006, 1008, 1010, 1018, 1102, 1104, and 1106. The communication manager 1532 further includes an RRC component 1542 that is configured to transmit an updated paging subgroup ID of the UE based on a release of an RRC connection of the UE to the RRC inactive state, transmit the updated paging subgroup ID of the UE, determine to release the UE into the RRC idle state, and transmit the RRC release message instructing the UE to enter the RRC idle state. The RRC release message may include the updated paging subgroup ID of the UE, e.g., as described in connection with 1012, 1014, 1016, and 1020. The communication manager 1532 further includes a paging message component 1544 that is configured to receive the paging notification associated with the paging subgroup ID, and transmit a first paging indication based on the first paging notification in a first paging occasion associated with the paging subgroup ID of the UE, e.g., as described in connection with 1022 and 1024. The communication manager 1532 further includes a system information broadcasting component 1546 that is configured to transmit system information indicating a number of the UE subgroups assigned by at least one of the core network including the AMF or the base station, e.g., as described in connection with 1026.

The apparatus may include additional components that perform each of the blocks of the algorithm in the flowcharts of FIGS. 7, 12, and 13. As such, each block in the flowcharts of FIGS. 7, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for receiving, from a network, a UE context modification message including an indication of at least one subgroup ID for a first UE based on an RRC state change for the first UE, means for receiving, from the network, a first paging notification associated with the subgroup ID, and means for transmitting, to the first UE, a first paging indication based on the first paging notification in a first paging occasion associated with the subgroup ID of the first UE. The apparatus 1502 includes means for transmitting paging assistance information to the network based on the RRC state change for the UE, means for transmitting, to the first UE, an updated subgroup ID of the first UE based on a release of an RRC connection of the first UE to an RRC inactive state, means for transmitting, to the network, the updated subgroup ID of the first UE, means for transmitting the updated subgroup ID to the first UE in an RRC release message, and means for transmitting the updated subgroup ID to the network in an RRC inactive transition report. The apparatus 1502 includes means for transmitting, to a plurality of UEs including the first UE and a second UE, system information indicating a number of the UE subgroups assigned by at least one of a network or the base station, and means for transmitting, to a second UE, a second paging indication in a second paging occasion associated with a subgroup ID based on a UE-ID of the second UE. The apparatus 1502 includes means for receiving, from the network, a second paging notification including an indication that the second UE does not support subgrouping assigned by the network. The means may be one or more of the components of the apparatus 1502 configured to perform the functions recited by the means. As described supra, the apparatus 1502 may include the TX processor 316, the RX processor 370, and the controller/processor 375. As such, in one configuration, the means may be the TX processor 316, the RX processor 370, and the controller/processor 375 configured to perform the functions recited by the means.

Figure 16:
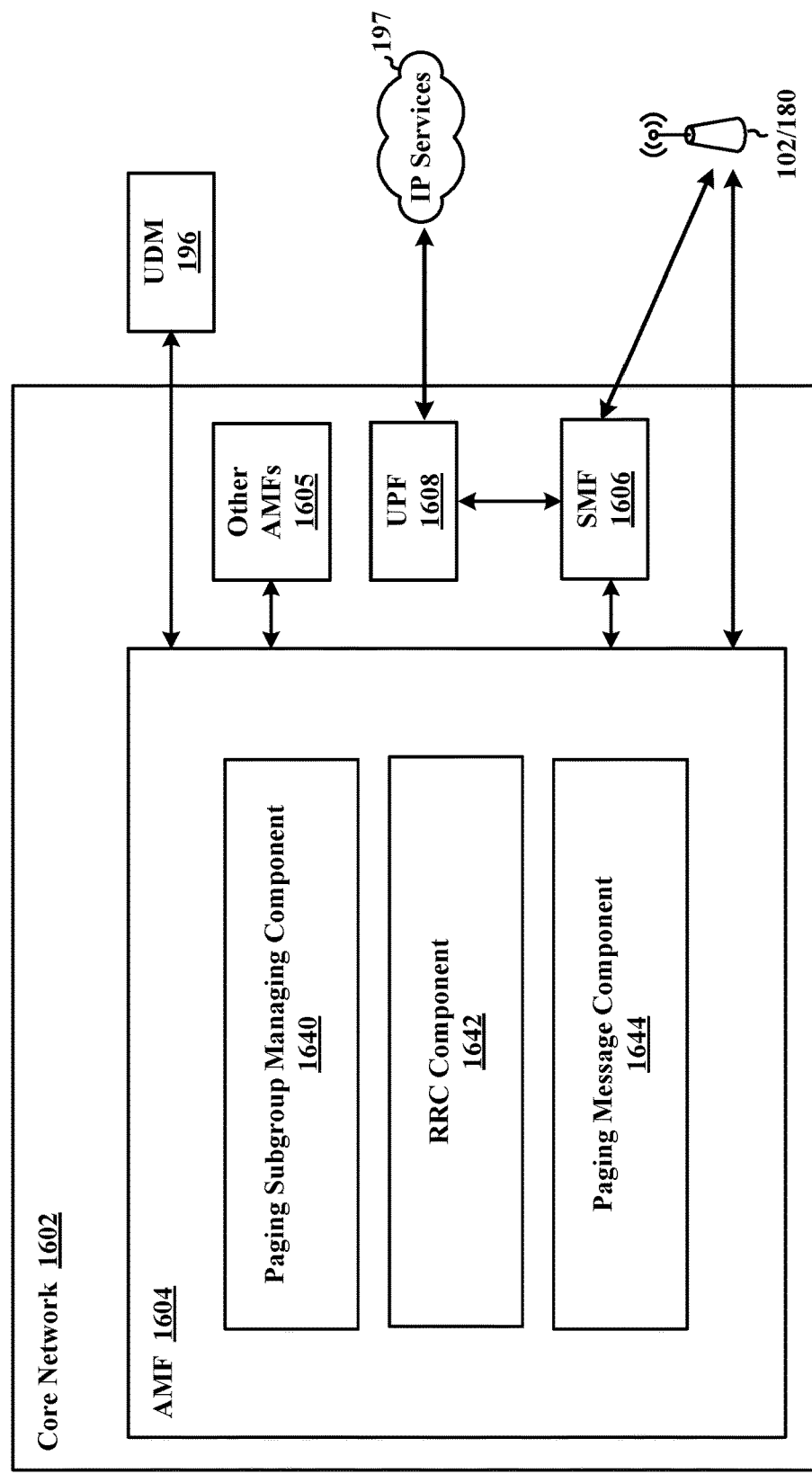
FIG. 16 is a diagram illustrating an example of a hardware implementation for an example apparatus.

FIG. 16 is a diagram 1600 illustrating an example of a hardware implementation for an apparatus 1602. The apparatus 1602 may be a core network, a component of a core network, or may implement core network functionality. The apparatus 1602 may include an AMF 1604, other AMFs 1605, a SMF 1606, and a UPF 1608. The AMF 1604 may be in communication with an UDM 196. The AMF 1604 is the control node that processes the signaling between the UEs 104 and the apparatus 1602. Generally, the AMF 1604 provides QoS flow and session management. All user IP packets are transferred through the UPF 1608. The AMF 1604 may communicate directly or through the SMF 1606 with the BS 102/180. The UPF 1608 provides UE IP address allocation as well as other functions. The UPF 1608 is connected to the IP Services 197. The IP Services 197 may include the Internet, an intranet, an IP Multimedia Subsystem (IMS), a Packet Switch (PS) Streaming (PSS) Service, and/or other IP services.

The AMF 1604 includes a paging subgroup managing component 1640 that is configured to perform an initial paging subgroup assignment of the UE with the UE and the base station, receive the indication of the UE capability indicating whether the UE supports the subgrouping assignment by the network, receive the UPAI for the UE, transmit an updated paging subgroup ID of the UE determined based on the paging assistance information, transmit a UE context setup message including the updated paging subgroup ID of the UE based on the RRC state change for the UE, receive an indication about a change in the RRC connection with the UE to the RRC idle state, transmit an updated paging subgroup ID of the UE in response to receiving the indication from the base station, and transmit the UE context modification message including the indication of at least one subgroup ID for the UE based on the RRC state change for the UE, e.g., as described in connection with 1202, 1204, 1206, 1208, 1210, 1212, 1214, 1220, 1306, 1308, and 1310. The AMF 1604 further includes an RRC component 1642 that is configured to receive the updated paging subgroup ID of the UE, and determine to release the UE into the RRC idle state, e.g., as described in connection with 1216 and 1218. The AMF 1604 further includes a paging message component 1644 that is configured to transmit the paging notification associated with the paging subgroup ID, e.g., as described in connection with 1222.

The apparatus may include additional components that perform each of the blocks of the algorithm in the flowcharts of FIGS. 7, 10, and 11. As such, each block in the flowcharts of FIGS. 7, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the AMF 1604, includes means for receiving paging assistance information for a first UE, transmit a subgroup ID of the UE determined based on the paging assistance information, and means for transmitting, to a base station, a UE context setup message including a subgroup ID of the first UE. The apparatus 1602 includes means for receiving, from the base station, an indication about a change in an RRC connection with the first UE to an RRC idle state, means for transmitting, to the base station, an updated subgroup ID of the first UE in response to receiving the indication from the base station, means for receiving, from the first UE, a first UE capability indicating that the first UE supports subgrouping assigned by the network. The apparatus 1602 includes means for receiving, from a second UE, a second UE capability indicating that the second UE does not support subgrouping assigned by the network, and means for transmitting, to the base station, a second paging notification including an indication that the second UE does not support subgrouping assigned by the network. The means may be one or more of the components of the apparatus 1602 configured to perform the functions recited by the means. As described supra, the apparatus 1602 may include the TX processor 316, the RX processor 370, and the controller/processor 375. As such, in one configuration, the means may be the TX processor 316, the RX processor 370, and the controller/processor 375 configured to perform the functions recited by the means.

In an aspect of the disclosure, a method, a computer-readable medium, and an apparatus are provided. The method may include a UE, a base station, and a core network. In some aspects, the UE may initiate an update of the paging subgroup ID assigned to the UE by transmitting paging assistance information to the AMF. The paging assistance information may include at least one of a paging probability, a mobility profile, or a power profile of the UE. In one aspect, the paging assistance information may be transmitted in one or more of a registration request message or a registration update message, and the paging subgroup ID may be received in a registration acceptance message from the core network. In another aspect, the paging subgroup ID is received in an RRC release message from the base station.

The base station may initiate an update of the paging subgroup ID assigned to the UE based on the change of RRC connection between the UE and the base station. The core network including the AMF may transmit an updated paging subgroup ID to the UE. In one aspect, the RRC state change includes a change of an RRC connection with the first UE to an RRC inactive state, and the base station may transmit paging assistance information to the network based on the RRC state change for the UE. The Core network including the AMF may configure an updated paging subgroup ID in response to the paging assistance information.

The core network including the AMF may configure a set of candidate subgroups associated with the UE, and the base station may update the paging subgroup ID of the UE based on releasing the RRC connection to the RRC inactive state. The core network may receive a UE capability indicating whether the UE supports subgrouping assigned by the network, and transmit the updated paging subgroup ID to the UE.

The core network including the AMF may receive, from a second UE, a second UE capability indicating that the second UE does not support subgrouping assigned by the network, and transmit, to the base station, a second paging notification including an indication that the second UE does not support subgrouping assigned by the network. The base station may transmit the second paging indication to the second UE in the second paging occasion with the subgroup ID based on the UE-ID of the second UE based on the second paging notification received from the network.

The UE may receive system information indicates a number of the UE subgroups assigned by at least one of the network or the base station, and monitor paging channel using the subgroup ID based on the UE receiving an assignment of the subgroup ID and the subgroup ID being less than the number of the subgroups indicated in the system information.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory, the at least one processor and the memory configured to transmit, to a network, a paging assistance information, and receive, from the network, a subgroup ID of the UE determined based on the paging assistance information.

Aspect 2 is the apparatus of aspect 1, further including a transceiver coupled to the at least one processor, and where the paging assistance information includes at least one of a paging probability, a mobility profile, or a power profile.

Aspect 3 is the apparatus of any of aspects 1 and 2, where the at least one processor is configured to transmit the paging assistance information in one or more of a registration request message or a registration update message, and the subgroup ID is received in a registration acceptance message from a network.

Aspect 4 is the apparatus of any of aspects 1 to 3, where the subgroup ID is received in an RRC release message from a base station.

Aspect 5 is the apparatus of any of aspects 1 to 4, where the at least one processor and the memory are further configured to receive, from a base station, system information indicating a number of the UE subgroups assigned by at least one of the network or the base station, and monitor paging channel using the subgroup ID based on the UE receiving an assignment of the subgroup ID and the subgroup ID being less than the number of the subgroups indicated in the system information.

Aspect 6 is the apparatus of any of aspects 1 to 5, where the at least one processor and the memory are further configured to transmit, to the network, a UE capability indicating whether the UE supports subgrouping assigned by the network.

Aspect 7 is a method of wireless communication for implementing any of aspects 1 to 6.

Aspect 8 is an apparatus for wireless communication including means for implementing any of aspects 1 to 6.

Aspect 9 is a computer-readable medium storing computer executable code, where the code when executed by a processor causes the processor to implement any of aspects 1 to 6.

Aspect 10 is an apparatus for wireless communication at a base station including at least one processor coupled to a memory, the at least one processor and the memory configured to receive, from a network, a message including an indication of at least one subgroup ID for a first UE based on an RRC state change for the first UE, receive, from the network, a first paging notification associated with the subgroup ID, and transmit, to the first UE, a first paging indication based on the first paging notification in a first paging occasion associated with the subgroup ID of the first UE.

Aspect 11 is the apparatus of aspect 10, where the message including an indication of at least one subgroup ID is a UE context modification message.

Aspect 12 is the apparatus of any of aspects 10 and 11, further including a transceiver coupled to the at least one processor, and where the first paging indication indicates a single subgroup ID for the UE in response to an indication of an RRC state change for the UE.

Aspect 13 is the apparatus of any of aspects 10 and 12, where the RRC state change includes a change of an RRC connection with the first UE to an RRC inactive state, the at least one processor and the memory being further configured to transmit paging assistance information to the network based on the RRC state change for the UE, where the subgroup ID of the first UE is associated with the change of the RRC connection with the first UE.

Aspect 14 is the apparatus of aspect 13, where the paging assistance information indicates an expected paging probability of the first UE.

Aspect 15 is the apparatus of any of aspects 10 to 14, where the message further includes a set of candidate subgroups associated with the RRC state change, where the at least one processor and the memory are further configured to transmit, to the first UE, an updated subgroup ID of the first UE from the set of candidate subgroups based on a release of an RRC connection of the first UE to an RRC inactive state, and transmit, to the network, the updated subgroup ID of the first UE.

Aspect 16 is the apparatus of aspect 15, where at least one processor and the memory are further configured to transmit the updated subgroup ID to the first UE in an RRC release message and transmit the updated subgroup ID to the network in an RRC inactive transition report.

Aspect 17 is the apparatus of any of aspects 10 to 16, where the at least one processor and the memory are further configured to transmit, to a plurality of UEs including the first UE and a second UE, system information indicating a number of the UE subgroups assigned by at least one of a network or the base station, and transmit, to a second UE, a second paging indication in a second paging occasion associated with a subgroup ID based on a UE-ID of the second UE.

Aspect 18 is the apparatus of aspect 17, where the at least one processor and the memory are further configured to receive, from the network, a second paging notification including an indication that the second UE does not support subgrouping assigned by the network, where the second paging indication is transmitted to the second UE in the second paging occasion with the subgroup ID based on the UE-ID of the second UE based on the second paging notification received from the network.

Aspect 19 is a method of wireless communication for implementing any of aspects 10 to 18.

Aspect 20 is an apparatus for wireless communication including means for implementing any of aspects 10 to 18.

Aspect 21 is a computer-readable medium storing computer executable code, where the code when executed by a processor causes the processor to implement any of aspects 10 to 18.

Aspect 22 is an apparatus for wireless communication at a core network including an AMF including at least one processor coupled to a memory, the at least one processor and the memory configured to receive paging assistance information for a first UE, transmit a subgroup ID to the UE determined based on the paging assistance information, and transmit, to a base station, a message including a subgroup ID of the first UE.

Aspect 23 is the apparatus of aspect 22, where the message including an indication of at least one subgroup ID is a UE context modification message.

Aspect 24 is the apparatus of any of aspects 22 and 23, further including a transceiver coupled to the at least one processor, and where the paging assistance information is received in a registration request message from the UE, and the subgroup ID is transmitted to the UE in a registration acceptance message from the network.

Aspect 25 is the apparatus of any of aspects 22 and 24, where the paging assistance information is RAN paging assistance information from the base station.

Aspect 26 is the apparatus of aspect 25, where the RAN paging assistance information indicates an expected paging probability of the first UE.

Aspect 27 is the apparatus of any of aspects 22 to 26, where the at least one processor and the memory are further configured to receive, from the base station, an indication about a change in an RRC connection with the first UE to an RRC idle state, and transmit, to the base station, an updated subgroup ID of the first UE in response to receiving the indication from the base station.

Aspect 28 is the apparatus of any of aspects 22 to 27, where the message including the subgroup ID of the first UE further includes a set of candidate subgroups associated with the first UE, where the at least one processor and the memory are further configured to receive, from the base station, an updated subgroup ID of the first UE.

Aspect 29 is the apparatus of any of aspects 22 to 28, where the at least one processor and the memory are further configured to receive, from the first UE, a first UE capability indicating that the first UE supports subgrouping assigned by the network.

Aspect 30 is the apparatus of any of aspects 22 to 29, where the at least one processor and the memory are further configured to receive, from a second UE, a second UE capability indicating that the second UE does not support subgrouping assigned by the network, and transmit, to the base station, a second paging notification including an indication that the second UE does not support subgrouping assigned by the network.

Aspect 31 is a method of wireless communication for implementing any of aspects 22 to 30.

Aspect 32 is an apparatus for wireless communication including means for implementing any of aspects 22 to 30.

Aspect 33 is a computer-readable medium storing computer executable code, where the code when executed by a processor causes the processor to implement any of aspects 22 to 30.

What is claimed is:

1. A network apparatus for wireless communication, comprising:
   memory; and
   at least one processor coupled to the memory and configured to cause the network apparatus to:
   receive paging assistance information for a first user equipment (UE);
   provide a subgroup identifier (ID) to the first UE determined based on the paging assistance information;
   provide, to a base station, a message including the subgroup ID of the first UE; and
   receive, from the base station, an updated subgroup ID of the first UE.

2. The network apparatus of claim 1, wherein the message to the base station including an indication of at least one subgroup ID is a UE context modification message.

3. The network apparatus of claim 1, wherein the at least one processor is configured to cause the network apparatus to receive the paging assistance information in a registration request message from the UE, and provide the subgroup ID to the first UE in a registration acceptance message from the network apparatus.

4. The network apparatus of claim 1, wherein the paging assistance information is radio access network (RAN) paging assistance information from the base station.

5. The network apparatus of claim 4, wherein the RAN paging assistance information indicates an expected paging probability of the first UE.

6. The network apparatus of claim 1, wherein the at least one processor is further configured to cause the network apparatus to:
   receive, from the base station, an indication about a change in a radio resource control (RRC) connection with the first UE to an RRC idle state; and
   provide, to the base station, an additional updated subgroup ID of the first UE in response to receiving the indication from the base station.

7. The network apparatus of claim 1, wherein the message to the base station including the subgroup ID of the first UE further includes a set of candidate subgroups associated with the first UE.

8. The network apparatus of claim 1, wherein the at least one processor is further configured to cause the network apparatus to receive a first UE capability indicating that the first UE supports subgrouping assigned by the network apparatus.

9. The network apparatus of claim 1, further comprising a transceiver coupled to the at least one processor.

10. A network apparatus for wireless communication, comprising:
    memory; and
    at least one processor coupled to the memory and configured to cause the network apparatus to:
    receive paging assistance information for a first user equipment (UE);
    provide a subgroup identifier (ID) to the first UE determined based on the paging assistance information;
    provide, to a base station, a message including the subgroup ID of the first UE;
    receive a second UE capability indicating that a second UE does not support subgrouping assigned by the network apparatus; and
    provide, to the base station, a second paging notification including an indication that the second UE does not support the subgrouping assigned by the network apparatus.

11. A method of wireless communication at a network apparatus, comprising:
    receiving paging assistance information for a first user equipment (UE);
    providing a subgroup identifier (ID) to the first UE determined based on the paging assistance information;
    providing, to a base station, a message including the subgroup ID of the first UE; and
    receiving, from the base station, an updated subgroup ID of the first UE.

12. The method of claim 11, wherein the message to the base station including an indication of at least one subgroup ID is a UE context modification message.

13. The method of claim 11, wherein the paging assistance information is in a registration request message from the UE, and the subgroup ID is provided to the first UE in a registration acceptance message from the network apparatus.

14. The method of claim 11, wherein the paging assistance information is radio access network (RAN) paging assistance information from the base station.

15. The method of claim 14, wherein the RAN paging assistance information indicates an expected paging probability of the first UE.

16. The method of claim 11, further comprising:
receiving, from the base station, an indication about a change in a radio resource control (RRC) connection with the first UE to an RRC idle state; and
providing, to the base station, an additional updated subgroup ID of the first UE in response to receiving the indication from the base station.

17. The method of claim 11, wherein the message to the base station including the subgroup ID of the first UE further includes a set of candidate subgroups associated with the first UE.

18. The method of claim 11, further comprising:
receiving a first UE capability indicating that the first UE supports subgrouping assigned by the network apparatus.

19. A method of wireless communication at a network apparatus, comprising:
receiving paging assistance information for a first user equipment (UE);
providing a subgroup identifier (ID) to the first UE determined based on the paging assistance information;
providing, to a base station, a message including the subgroup ID of the first UE;
receiving a second UE capability indicating that a second UE does not support subgrouping assigned by the network apparatus; and
providing, to the base station, a second paging notification including an indication that the second UE does not support the subgrouping assigned by the network apparatus.

20. An apparatus for wireless communication at a network apparatus, comprising:
means for receiving paging assistance information for a first user equipment (UE);
means for providing a subgroup identifier (ID) to the first UE determined based on the paging assistance information;
means for providing, to a base station, a message including the subgroup ID of the first UE; and
means for receiving, from the base station, an updated subgroup ID of the first UE.

21. The apparatus of claim 20, further comprising:
means for receiving, from the base station, an indication about a change in a radio resource control (RRC) connection with the first UE to an RRC idle state; and
means for providing, to the base station, an additional updated subgroup ID of the first UE in response to receiving the indication from the base station.

22. The apparatus of claim 20, wherein the message to the base station including the subgroup ID of the first UE further includes a set of candidate subgroups associated with the first UE.

23. The apparatus of claim 20, further comprising:
means for receiving a first UE capability indicating that the first UE supports subgrouping assigned by the network apparatus.

24. An apparatus for wireless communication at a network apparatus, comprising:
means for receiving paging assistance information for a first user equipment (UE);
means for providing a subgroup identifier (ID) to the first UE determined based on the paging assistance information;
means for providing, to a base station, a message including the subgroup ID of the first UE;
means for receiving a second UE capability indicating that a second UE does not support subgrouping assigned by the network apparatus; and
means for providing, to the base station, a second paging notification including an indication that the second UE does not support the subgrouping assigned by the network apparatus.

25. A non-transitory computer-readable medium storing computer executable code at a network apparatus, the code when executed by at least one processor causes the network apparatus to:
receive paging assistance information for a first user equipment (UE);
provide a subgroup identifier (ID) to the first UE determined based on the paging assistance information;
provide, to a base station, a message including the subgroup ID of the first UE; and
receive, from the base station, an updated subgroup ID of the first UE.

26. The non-transitory computer-readable medium of claim 25, wherein the code when executed by the at least one processor further causes the network apparatus to:
receive, from the base station, an indication about a change in a radio resource control (RRC) connection with the first UE to an RRC idle state; and
provide, to the base station, an additional updated subgroup ID of the first UE in response to receiving the indication from the base station.

27. The non-transitory computer-readable medium of claim 25, wherein the message to the base station including the subgroup ID of the first UE further includes a set of candidate subgroups associated with the first UE.

28. The non-transitory computer-readable medium of claim 25, wherein the code when executed by the at least one processor further causes the network apparatus to:
receive a first UE capability indicating that the first UE supports subgrouping assigned by the network apparatus.

29. A non-transitory computer-readable medium storing computer executable code at a network apparatus, the code when executed by at least one processor causes the network apparatus to:
receive paging assistance information for a first user equipment (UE);
provide a subgroup identifier (ID) to the first UE determined based on the paging assistance information;
provide, to a base station, a message including the subgroup ID of the first UE;
receive a second UE capability indicating that a second UE does not support subgrouping assigned by the network apparatus; and
provide, to the base station, a second paging notification including an indication that the second UE does not support the subgrouping assigned by the network apparatus.

* * * * *